(12) United States Patent
Ismail et al.

(10) Patent No.: US 9,205,977 B2
(45) Date of Patent: Dec. 8, 2015

(54) WASTE RECYCLING AND COMPACTOR

(75) Inventors: Peter Ismail, Perth (GB); Roger Leake, Edinburgh (GB); Rennie McIntosh, Edinburgh (GB); Alan Kitching, Edinburgh (GB)

(73) Assignee: PRYDE FOUNDATION, Vaduz (LI)

( * ) Notice: Subject to any disclaimer, the term of this patent is extended or adjusted under 35 U.S.C. 154(b) by 305 days.

(21) Appl. No.: 13/575,085

(22) PCT Filed: Feb. 24, 2011

(86) PCT No.: PCT/GB2011/000253
§ 371 (c)(1),
(2), (4) Date: Sep. 7, 2012

(87) PCT Pub. No.: WO2011/104507
PCT Pub. Date: Sep. 1, 2011

(65) Prior Publication Data
US 2013/0055908 A1     Mar. 7, 2013

(30) Foreign Application Priority Data
Feb. 25, 2010    (GB) .................................. 1003153.2

(51) Int. Cl.
*B30B 15/00*    (2006.01)
*B30B 7/00*     (2006.01)
*B65F 1/14*     (2006.01)
(Continued)

(52) U.S. Cl.
CPC ............. *B65F 1/0033* (2013.01); *B65F 1/1426* (2013.01); *B30B 9/3092* (2013.01); *B65F 2210/1125* (2013.01); *B65F 2210/137* (2013.01); *Y02W 30/10* (2015.05)

(58) Field of Classification Search
CPC ................. B65F 1/0033; B65F 1/1426; B65F 2210/1125; B65F 2210/1121; B65F 2210/137; B30B 7/00; B30B 9/3092; Y02W 30/10
USPC ............ 100/35, 345, 99, 206, 208, 209, 215, 100/221, 225, 226, 229 R, 232, 237, 240, 100/246, 250, 251, 902, 342, 205; 414/487
See application file for complete search history.

(56) References Cited

U.S. PATENT DOCUMENTS 3,808,967 A * 5/1974 Fair et al. ...................... 100/221
5,122,025 A * 6/1992 Glomski ....................... 414/486
(Continued)

FOREIGN PATENT DOCUMENTS

DE     4340857     6/1995
EP     1050489     11/2000
(Continued)

OTHER PUBLICATIONS

International Search Report and Written Opinion for PCT/GB2011/000253 dated Jun. 7, 2011.

*Primary Examiner* — Jimmy T Nguyen
(74) *Attorney, Agent, or Firm* — Snell & Wilmer L.L.P.

(57) ABSTRACT

The present invention relates to a waste processor for processing and compacting different types of waste. The processor has inlets for the different types of waste, each of which are connected to a respective collection zone. Passages may lead between each of the inlets and the respective collection zones. Each passage has a discrete compactor which is formed and arranged for effective compaction of the type of waste associated with the respective inlet. Each of the compactors is actuated by a single drive.

14 Claims, 21 Drawing Sheets

(51) Int. Cl.
    *B65F 1/00* (2006.01)
    *B30B 9/30* (2006.01)

(56) References Cited

U.S. PATENT DOCUMENTS

| | | | |
|---|---|---|---|
| 5,123,341 A | 6/1992 | Carter et al. | |
| 5,490,455 A * | 2/1996 | Conti et al. | 100/50 |
| 5,638,747 A * | 6/1997 | Peng | 100/45 |
| 5,988,972 A * | 11/1999 | Boivin | 414/487 |
| 6,903,142 B1 | 6/2005 | Stauber | |
| 7,481,159 B2 * | 1/2009 | Poss et al. | 100/48 |
| 2007/0257036 A1 * | 11/2007 | Nance | 220/211 |

FOREIGN PATENT DOCUMENTS

| | | |
|---|---|---|
| EP | 1382550 | 1/2004 |
| GB | 2407282 | 4/2005 |

* cited by examiner

WASTE RECYCLING AND COMPACTOR

CROSS-REFERENCE TO RELATED APPLICATIONS

This application is a U.S. national phase filing under 35 U.S.C. §371 of PCT/GB2011/000253 filed Feb. 24, 2011. The '253' application claims priority to and the benefit of United Kingdom Application No. GB1003153.2 filed on Feb. 25, 2010. Both of the aforementioned applications are incorporated herein by reference in their entirety.

FIELD OF THE INVENTION

The present invention relates to a processor suitable for the use in the collection of waste, particularly domestic waste but including also commercial waste, and for facilitating the recycling and reprocessing of such waste material.

BACKGROUND TO THE INVENTION

Many reusable and recyclable materials such as glass, plastic, metals, papers, cardboards and organic matter such as food are currently disposed of by the domestic householder or a commercial business collecting in bags or bins which are collected by the local authority and subsequently either incinerated and/or used in landfill sites and/or dump sites. Such methods of disposal are not only wasteful of many recyclable and reusable resources but also cause pollution to the environment.

For many householders and commercial businesses it is common practice now to separate out the various different forms of material that can be recycled and to collect them in individual containers which can then be uplifted by the local authority or other refuse collection organisations for recycling purposes. Accordingly it is now customary for householders and indeed restaurants and shops to have separate containers for paper, for cardboard, for glass (including different colours of glass), for plastics, and for organic waste material, typically waste food products.

A particular disadvantage of having a plurality of different containers is that they can take up valuable space in a kitchen or commercial premises particularly as such waste materials can take up a lot of space unless they are compacted or otherwise processed.

In our European Patent No. 0469122B (Application No. 91904618.5) of 19 Feb. 1991 we describe and disclose a domestic waste processor suitable for addressing one or more of the above-described disadvantages of recycling domestic and commercial waste. Since then there have been further patent applications directed to apparatus for handling waste materials including inter alia, GB2447612; PCT/IB2007/003511 & PCT/EP2007/005793.

One of the problems associated with processing and compacting domestic and commercial waste for recycling is that different types of material would require different types of compaction means due to the different types of physical properties of the materials e.g. the differences between plastics, glass, aluminium cans and other waste material.

In our above noted European Patent No. 0469122B we describe a waste processor which has a plurality of inlet means connected to respective collection zones and having compaction means formed and arranged for effective compaction of at least one of the plurality of different types of waste passing through the passage means. In practice this requires different compaction means and associated drive means and control means resulting in an appliance that is technically complex and very expensive to produce thus rendering such appliances unsuitable and too expensive for domestic use.

It is an object of the present invention to avoid or minimise one or more of the above disadvantages.

SUMMARY OF THE INVENTION

The present invention provides a waste processor for a plurality of different types of waste, comprising a housing having a plurality of inlet means connected to a respective collection zone preferably provided with removable containers, passage means between each said inlet means and said respective collection zones, each said passage means having a discrete compaction means formed and arranged for effective compaction of the type of waste associated with said inlet means and said respective collection zones;

Wherein said plurality of discrete compaction means are formed and arranged to be actuated by a single drive means.

With a waste processor according to the invention there is provided a convenient and economic manner for the collection of different types of waste in a form which substantially facilitates subsequent processing and recycling thereof, whilst at the same time simplifying the operation and manufacturing costs associated with the manufacture and operation of such a waste processor.

Preferably said waste processor is a domestic appliance generally similar in size and configuration to a washing machine, dishwasher or other similar domestic appliance and is desirably formed and arranged so as to be compatible with the modular design system of modern fitted kitchens. It will be appreciated that somewhat larger sizes may be used in for example hotels, restaurants etc for commercial waste of the type produced by such organisations.

Preferably said plurality of discrete compaction means are formed and arranged to be actuated by the single drive means so as to be operable simultaneously. Additionally, or alternatively, said plurality of discrete compaction means may be formed and arranged to be actuated by the single drive means so as to be operable sequentially.

Preferably said passage means are formed and arranged for substantially gravity fed operation of the processor whereby a user introducing a waste item to be processed through a respective one of said plurality of inlet means situated at the upper or top of the apparatus such that gravity introduces the waste material to the compaction means and then, once the waste has been compacted by the compaction means, may fall, again under gravity, into the collection zone and associated removable container.

Desirably the passage means are formed and arranged upstream of, adjacent or within the compaction means and is configured so as to restrict substantially user access to the compaction means through said passage means for safety reasons. Alternatively the inlet means and associated passage means are in the form of a hinged or sliding inlet drawer having a plurality of apertures corresponding to said inlet means, said inlet drawer being formed and arranged to open out of the housing so as to present said inlet means for receiving waste material, said inlet drawer being formed and arranged to hinge or slide back in to the housing to a closed position. Preferably the collection zones are housed in a collection module, which is a collection drawer which may be hinged or slide out of the bottom portion of the housing so as to facilitate access to the removable containers containing the processed/compacted waste material.

Various different types of compaction means can be used and may include, for example, a rotary paddle or blade compaction means or a reducing screw pitch type compaction means for compressing waste material. As each respective passage means is provided with individual compaction means the type of compaction means selected will depend on the type and nature of the waste material to be compacted by the respective compactor. For instance glass and metal require a substantially rigid compaction means compared to paper and organic waste which may be compacted. Preferably though all the compaction means take the form of a movable first plate formed and arranged to co-operate with a second plate so that the action of the first plate moving towards the second plate causes material therebetween to be crushed. In this arrangement the movable first plates are all mounted to a single support structure which is driven by said single drive means. The second plate may be a fixed plate. The second plate may be a movable second plate.

As used herein the expression "compaction means" indicates means for effecting the process which has the result of reducing to a greater or lesser extent the volume occupied by a waste material to be compacted. Thus the "compaction means" of the invention includes means for compressing waste and/or for reducing the size of an item of waste by squeezing, between at least two surfaces, the item of waste to be compacted. Thus for example a metal or aluminium can would be crushed by compression between said two faces whereas a glass item such as a bottle would be caused to shatter under the compression forces applied between said at least two faces so as to render the glass bottle into small pieces which has a significantly reduced volume compared to the volume of the glass bottle, such as 85%. At least one of the faces may be configured for compacting a specific type of waste. For example, one of the faces may comprise a load concentration means. Preferably, both of the glass compaction faces comprise an edge. Similarly, faces for compacting plastic may be profiled to impart a non-elastic deformation on the compacted plastic such that the compacted plastic remains more substantially in a compacted form, rather than springing back to an intermediate, partially compacted form when the compacting load is removed. The faces may be configured for compacting type-specific waste by providing inserts, such as blades mountable on a compression face. Reducing the volume occupied by waste materials enables an Increased mass of waste materials to be collected. The space occupied by a waste processor for collecting a given amount of waste materials may be reduced. Alternatively, the amount of waste materials that can be collected in a given collection volume can be increased. For example, a waste collection unit may occupy a smaller volume in a kitchen whilst also requiring less frequent emptying of waste materials for a given amount of waste.

Each compaction means may be associated with a discrete corresponding inlet means. For example a coloured glass compaction means may correspond to a coloured glass inlet. Each compaction means may be associated with a discrete corresponding collection zone. For example, compacted coloured glass waste from the coloured glass compaction means may be collected in a coloured glass collection zone. Alternatively, multiple compaction means may be associated with a single discrete corresponding collection zone. For example, both a plastics packaging compaction means and a plastics bottle compaction means may be associated with a single discrete corresponding plastics collection zone. Providing multiple discrete collection zones enables different types of waste to be collected in a segregated manner, such that segregated waste may be further distributed into a waste processing cycle, appropriate to that particular type of waste.

Providing discrete compaction means with corresponding discrete collection zones enables the compaction of different types of waste without cross-contamination of waste. For example, glass waste compacted with a glass compaction means does not become mixed with plastic waste compacted with a plastics compaction means.

Additionally or alternatively, a single compaction means may correspond to a plurality of collection zones. Waste may be directed to a collection zone according to the type of waste. For example, a cans compaction means may correspond to both a steel cans collection zone and an aluminium cans collection zone. Cross-contamination of such waste is reduced due to the inherent integrity of the compacted waste and the compaction means may be appropriate for more than one type of waste such that using a single compaction means for a plurality of types of waste may reduce complexity, space and/or costs.

A plurality of compaction means may be driven by a single drive source. Use of a single drive source for a plurality of compaction means reduces the space, complexity and/or expense otherwise required to drive multiple compaction means. For example, multiple compaction compartments may be operated by a force transmitted from a single drive source. The compaction means may be simultaneously activated. Simultaneous activation of multiple compaction means enables segregated waste of different categories to be compacted simultaneously. For example, a hydraulic motor may power a transmission shaft, the transmission shaft being connected to multiple compression compartments. Upon activation of the hydraulic motor, the shaft transmits a force to the multiple compartments simultaneously. A pump using food-based environmentally-friendly fluid may power the transmission shaft.

Alternatively, the single drive means drives a plurality of compaction means sequentially. Sequential activation increases the relative power available to each discrete compaction means. For example, an increased force may be used in one or more of the compaction means. Additionally, or alternatively, the capacity of the drive means may be reduced. Sequential activation may enable the use of a smaller drive means to deliver an equivalent load to each discrete compaction means.

Each compaction means may require a similar amount of drive. For example, each compaction means may comprise a compression surface, each compression surface being configured to traverse a similar distance and/or transmit a similar pressure when activated. Similar drive requirements for multiple compaction means enables simplification of the transmission system from a single drive means. For example, a plurality of compaction means with a similar length of compaction stroke enables the compaction means to be rigidly linked for simultaneous compaction. The compression surfaces may be of different size and or shape, configured for compaction of corresponding types of waste.

Additionally or alternatively, different proportions of drive from a single drive means are transmitted to different compaction means. For example, a larger force may be transmitted to, for example, a glass compaction means than for example, a plastics compaction means. The proportion of drive transmitted to a compaction means may vary with the level of resistance encountered by each compaction means during compaction. For example, a compaction means with no waste present may receive a lower relative proportion of drive from the transmission than a compaction means where waste is present.

Preferably the inlet means are clearly identified as to which type of waste material can be inserted to ensure that different waste materials are compacted and collected separately. When processing different types of metal it is not always apparent to a user whether the metal is ferrous or non-ferrous and thus in use of an inlet means identified for metals there may be provided a magnetic separator means formed and arranged for separating ferrous and non-ferrous metals into respective compaction means and compaction zones. Multiple inlet means may be grouped within an inlet module. For example, multiple inlet means may be grouped in a drawer, accessed by opening the inlet drawer. When the inlet drawer is closed, access to the inlet means is prevented. Where the drawer is a hinged drawer, the inlet means may be accessed by tilting the drawer forwards. The inlet means may be configured such that, upon closing the drawer, for example by tilting backwards, waste material is fed into the respective passage means by gravity. Alternatively, the inlet means may be accessed by a linear movement, for example a sliding drawer. Horizontal translation of the inlet drawer may provide access to multiple inlet means. Sliding such an inlet drawer to the closed position may contribute to the progression of waste into the compaction means.

The inlet drawer and/or the collection drawer may be configured to prevent access when the drive means and/or a compaction means is active. For example, the inlet drawer may comprise a lock mechanism, activated when the drive means is activated.

The collection module may also include inlet means. For example, a collection drawer may be configured to open to at least two distinct positions. In a first open position, the collection drawer may provide access to an inlet means, for example a waste paper inlet means. Access to collection zones within the collection drawer may be restricted whilst the collection drawer is in the first open position. In a second open position, the collection drawer may provide access to the collection zones. Access to the collection zones may be limited by a safety mechanism. For example, providing access to the collection zones may be limited by a latch, limiting the extent to which the collection drawer opens. The latch may be released thus enabling further opening of the collection drawer. For example, such a latch may limit opening of the collection drawer to the first open position to provide access to the waste paper inlet; manually releasing the latch enabling progression of the collection drawer to the second open position to provide access to the collection zones. Some of the collection zones may house waste which may be dirty and/or harmful such that it may be desirable to restrict access to the collection zones, particularly for children. There may be a latch on one or both sides of the collection drawer.

Inlet means within the collection drawer may be directly associated with a corresponding compaction means. For example, the inlet means may be an opening into a compressible container. Waste may be directly compacted in the container.

The compaction means directly associated with the inlet means may not be driven by the single drive means associated with other compaction means. For example, such a compaction means may be driven by another drive means such as the force associated with closing the collection drawer. The waste in such a compaction means, for example waste paper, requires a lower compaction force such that the action of closing the drawer may compact the waste paper sufficiently. Closing the drawer may be driven by manual action. Additionally, or alternatively, closing of the drawer may be driven: for example manual closing of the drawer may be assisted by a spring mechanism. Alternatively or additionally, the compaction means directly associated with the inlet means may be driven by the single drive means used to drive other compaction means.

The collection zones may be directly associated with the inlet means, such as a plastics inlet means which may be directly associated with a plastics collection zone. Alternatively, the collection zones may be connected to the inlet means via the passage means, such as a clear glass passage which connects the clear glass inlet means with the clear glass collection zone.

The compaction means may be located in the passage means. The passage means may include means that regulates the transition of waste through the passage means. The regulating means may retain the waste in the passage means prior to compaction. Upon compaction of the waste in the passage means, the regulating means may open such that, upon release of the compacted waste by the compaction means, the compacted waste passes through the regulating means. Once the compacted waste has passed through the regulating means, it returns to a closed position to retain subsequent waste in the passage means until a subsequent compaction cycle. The regulating means may comprise a flap, or a pair of flaps, that is hinged such that the flap extends generally downwards when opened. Additionally, or alternatively, the regulating means may comprise a sliding hatch. Substantially horizontal movement of the hatch reduces the height required for opening the regulating means thus enabling the collection zones and/or the compaction means to have increased height. The passage means may be configured such that waste passes through the passage means by gravity such that opening the regulating means allows waste to fall into the collection zone underneath. The default condition for the regulating means may be generally in the closed position, providing segregation between collection zones and inlet means. Activation of the compacting means may open the associated regulating means temporarily. Upon completion of a compaction cycle associated with the compaction means, the regulating means may remain open for a delayed period such that compacted waste may pass through the regulating means. Thereafter the regulating means may return to the default closed position. The regulating means may be returned to the closed position by the movement of the compaction means to the original, inactive position. The regulating means may be closed by the single drive source.

The passage means may include collection zone selection means. For example, a passage may include a deflector configured to direct different types of waste into different collection containers. The deflector may be manually controlled, e.g. a user may insert a can in a can compacting means and select whether the can is aluminium or steel, such that the deflector is positioned to direct the compacted can to the aluminium or steel waste container as appropriate. Alternatively, the deflector may be automatically controlled, e.g. a sensor or a magnet may cause steel cans to be deflected to a steel can waste container.

The compaction means may comprise a waste-retaining means. For example, a glass compaction means may comprise a cover. The cover may seal the compaction means such that compaction products are retained within the compaction means, and/or prevented from passing through the inlet means. For example, a glass compaction means cover may be opened to allow glass waste to pass into the glass compaction means, thereafter the cover being closed to prevent glass shards passing through the inlet means. The cover may be configured to allow viewing of the compaction means when the cover is closed. For example, the cover may be transparent. The cover may provide indication of the type of waste associated with the compaction means. For example, a compaction means for clear glass may comprise a clear transparent portion and a compaction means for coloured glass may comprise a coloured transparent portion. The cover may be manually opened. For example, the cover may be hinged with a grip enabling a user to open and close the cover. Additionally, or alternatively opening of the cover may be connected to another event. For example, the cover may be unlocked and/or opened by the opening of an inlet drawer.

For hygienic purposes and for ease of emptying and/or collection said removable containers are preferably manufactured from suitable plastics material e.g. polyethylene or polypropylene, that is easy to remove, replace, clean and/or to handle. Preferably said removable containers are provided with handles to facilitate carrying and provided with smooth surfaces to facilitate cleaning. Desirably each offset removable containers may be colour coded to identify it with a particular type of waste material and may be formed and arranged in said drawer assembly to fit into said drawer in one way only thereby facilitating ease of use. The containers may comprise inlets configured for communication with corresponding passage means. For example, the containers may be of substantially prismic form, comprising openings in upper surfaces such that compacted waste material exiting a said passage means passes into a corresponding container under gravity. The container inlet opening may be larger than a passage outlet, such that tolerances, particularly positioning tolerances, do not adversely affect the passage of waste material from the passage means into the container. The container inlet opening may also be configured as a container outlet opening. For example, the container may be configured to be emptied at a further waste processing site, for example a recycling bin or collection point, by tilting the container such that waste falls out of the container through the opening.

The containers may be adapted for unique configuration within a collection drawer such that each discrete container is positioned for communication with a corresponding discrete passage means. The positioning of the containers may be defined by the design of the containers. For example, the containers may have unique forms such that they are not interchangeable within a collection drawer. Providing containers that correspond only with one passage means ensures that waste contamination does not occur between waste processing cycles. For example, clear glass waste remnants not removed from the clear glass container whilst emptying the clear glass container at a site of further waste processing remain in the clear glass container and cannot be positioned for communication with, for example, coloured glass passage means. Alternatively, the containers may have similar forms such that manufacture using similar tools is enabled. For example, containers configured for different categories of waste may be manufactured form the same mould using different coloured plastic to provide differentiation between the containers.

Alternatively, the containers may comprise valves; the valves preferably configured to cooperate with the passage means such that only compacted waste enters the containers. Locating valves on the containers ensures that odours escaping from the containers are reduced when, for example, the lower drawer is partially opened, for example to access the waste paper inlet means. Locating valves on the containers may provide alternative or additional child safety protection, limiting access to the collection containers. The container valves may be manually activated, to facilitate emptying the contents of the containers. For example, the containers may comprise a manual release latch, or alternatively the valve may be configured to open when the container is inverted. The valves may also be configured for activation by the passage means and/or the compaction means. For example, the valve may be opened whenever the container is positioned for communication with the passage means. Alternatively the valve may be opened whenever the compaction means is activated.

Preferably said plurality of removable containers arranged in said collection drawer are provided with appropriate stops and locks to lock them into position in the collection drawer. Preferably said collection drawer is mounted on slide rails and is provided with an open collection drawer sensor switch formed and arranged with said single drive means such that in the event of the collection drawer being opened the drive means for the compaction means cannot operate. The drive means transmission may be configured such that opening the collection drawer disconnects the drive means from the compaction means. Similarly, opening the inlet drawer may disconnect the drive means from the compaction means. An open inlet drawer sensor may prevent operation of the drive means and/or the compaction means when the inlet drawer is open.

Preferably the waste processor of the invention is provided with an internal washing system whereby upon completion of the compaction process, water from a domestic water supply is piped through the processor and optionally mixed with a detergent, to form a cleaning agent for introduction into the passage means so as to wash those parts of the waste processor that have come into contact with the waste material.

The waste processor according to the invention may be provided with an extractor fan formed and arranged to extract air out of the housing and remove any unpleasant odours after use of the system. Additionally or alternatively a fan may circulate air within the housing, through a filter, for example a carbon filter, and remove unpleasant odours. Preferably the housing and the collection drawer and inlet drawer are provided with hygienic sealing means for minimising the escape of odours from the collected waste materials.

Desirably the materials used in manufacture of the waste processor according to the invention and its associated parts are materials that are able to resist the corrosive, sharp, abrasive, flammable etc nature of the materials that the processor handles. Desirably also the inlet means, passage means and removable containers have smooth surfaces and corners to prevent jamming and subsequent build up of waste materials and in addition to facilitating cleaning of said inlet and passage means.

Preferably, the waste processor includes a door open indicator. The inlet and/or outlet door may be connected via a sensor to an indicator to indicate that a door is open. A single indicator may correspond to more than one door. For example, indication may be provided that one of several drawers is open. Alternatively, multiple indicators may be provided, each indicator corresponding to a different door. The indicator may be a visual and/or audio indicator. For example, an indicator such as an LED mounted on the door may flash or otherwise become activated when a door is opened. Similarly, an audio signal may be emitted when a door is opened. The indicator may be temporal. For example, the indicator may beep for 5 seconds upon door opening, thereafter remaining silent. Additionally, or alternatively, the indicator may be absolute. For example, the indicator may illuminate continuously whilst the door is open.

Preferably the waste processor further includes a compaction activation means. For example, the waste processor has a compaction on/off switch. A user may activate the switch to initiate compaction. Additionally, or alternatively, compaction means may be activated by another event. For example, compaction means may be activated by closing an inlet drawer. Whenever an inlet drawer is opened, it is anticipated that waste has been inserted such that it may be desirable to activate compaction means upon subsequent closing of the inlet drawer.

Preferably the waste processor includes a compacted waste sensor. For example, each compacted waste container may be in communication with a sensor. The sensor may determine when a container has no more capacity for receiving compacted waste, or almost has no more capacity for receiving waste. The compacted waste sensor may be configured to provide indication that a container needs emptied. For example an indicator such as a glass bin full LED indicator associated with a glass container may be activated when the glass container is full. Additionally, or alternatively, an indicator may become activated when one of several containers becomes full. For example, a container full LED indicator may become activated when one of a plurality of sensors is triggered. Alternatively, a single sensor may monitor compacted waste levels in multiple containers. For example, a sensor, such as a signal detector in communication with a signal emitter may be configured to detect waste present between the emitter and the sensor.

Preferably the waste processor includes a container sensor. For example, the waste processor may detect when containers are removed and/or correctly positioned and/or incorrectly positioned. Additionally, or alternatively the compacted waste sensor may be configured to prevent further passage of compacted waste into the full, or nearly full, container. For example, the sensor may provide a signal preventing activation of a compaction means and/or the drive means.

Preferably the waste processor includes an inlet waste detection sensor for detecting waste in the inlet means. Additionally, the inlet waste detection sensor may detect the category of waste inserted. The inlet waste detection sensor may be configured to activate the compaction means and/or the drive means. Preferably, only a compaction means corresponding to an inlet means where appropriate waste has been inserted may be activated. Alternatively, said single drive means may be activated, driving a plurality of compaction means when any waste has been inserted via at least one of said inlet means.

In another respect the present invention also provides a method of facilitating the compaction of waste material comprising the steps of providing a waste processor according to the invention; separating the waste material into different categories and introducing different categories of waste into the different inlet means of the processor for collection in separate respective collection zones therein characterised in that each category of waste may be compacted by separate respective compaction means wherein a plurality of compaction means are driven by a single drive means.

The method may further comprise simultaneous compaction of different categories of waste.

Additionally, or alternatively, the method may further comprise sequential compaction of different categories of waste. By sequential compaction, it is understood that a first category of waste is compacted and a second category of waste is subsequently compacted.

BRIEF DESCRIPTION OF THE DRAWINGS

Further preferred features and advantages of the present invention will appear from the following detailed description given by way of example of embodiments illustrated with reference to the accompanying drawings in which:—

DETAILED DESCRIPTION OF EXAMPLE EMBODIMENTS

Figure 1:
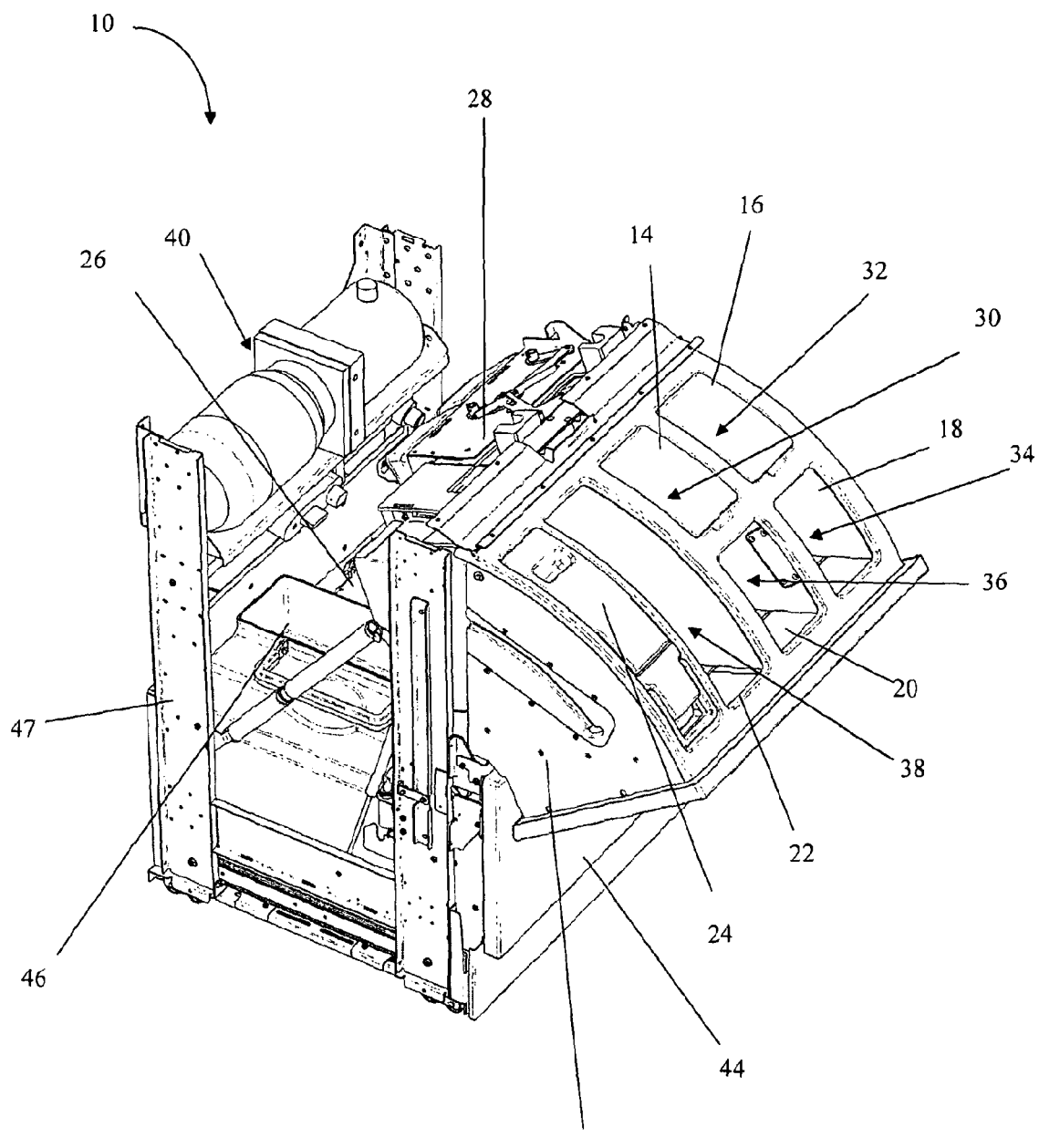
FIG. 1 is a cut away perspective view of a waste processor according to the invention.
Figure 2:
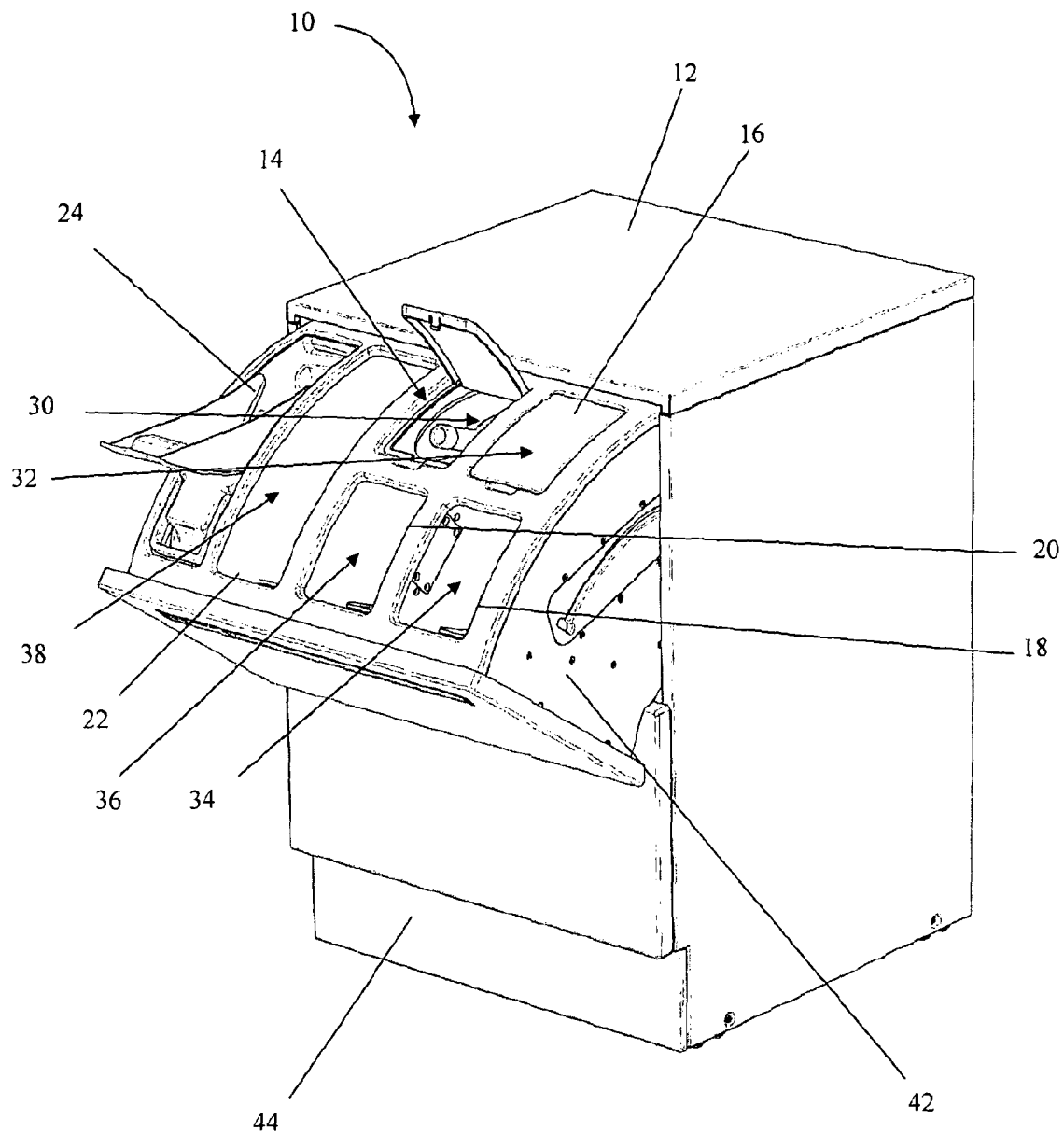
FIG. 2 is a perspective view of the waste processor of FIG. 1, with a waste receiving module shown in an open position.
Figure 3:
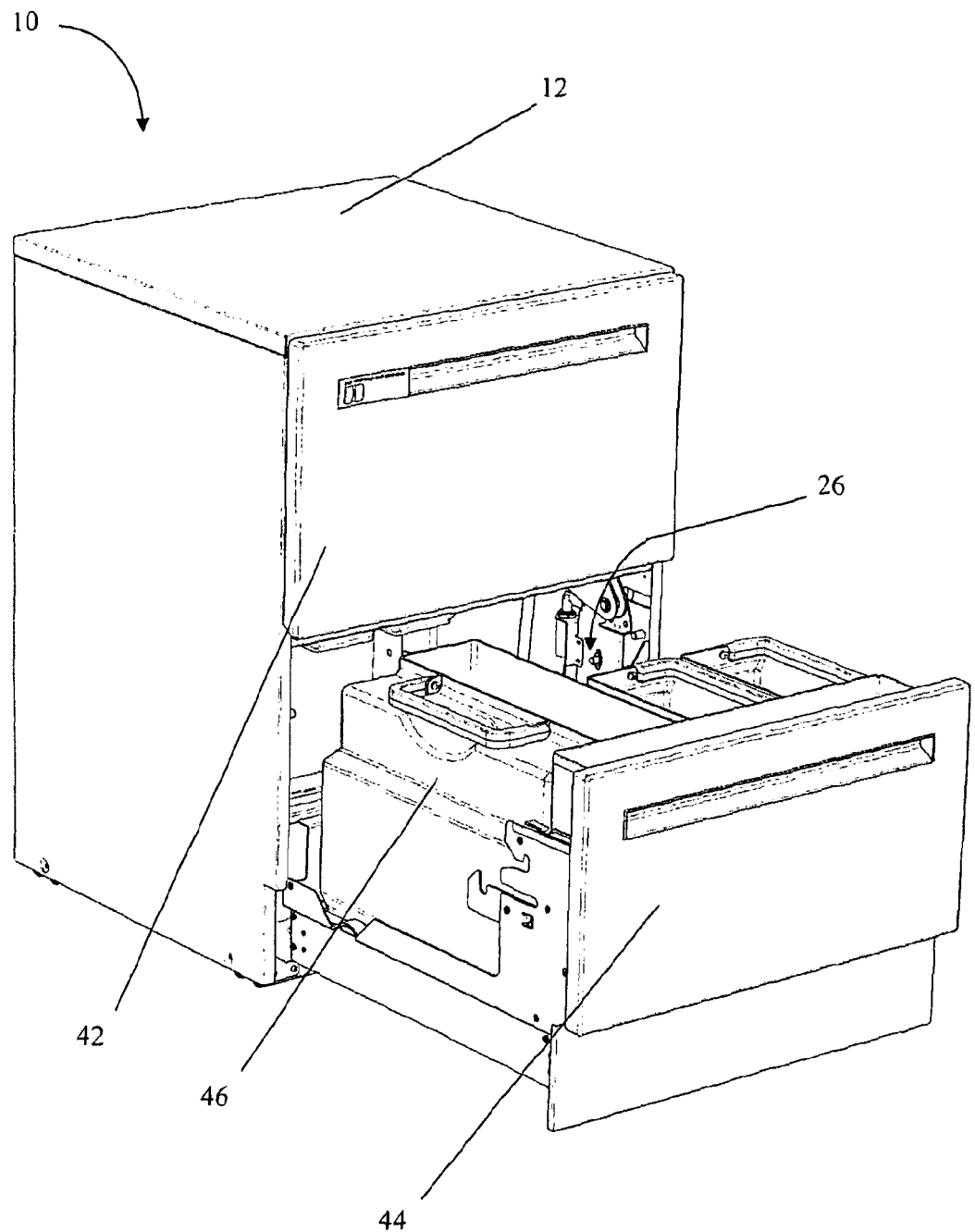
FIG. 3 is a perspective view of the waste processor of FIG. 1 with a waste collection module shown in an open position.

Reference is made to FIGS. 1, 2 and 3 by way of illustration of a waste processor 10 in accordance with an embodiment of the present invention. A housing 12 has six inlet apertures for receiving six different categories of waste. In the embodiment shown, the inlet apertures are: a coloured glass inlet aperture 14; a clear glass inlet aperture 16; an cans inlet aperture 18; a mixed plastics inlet aperture 20; a plastic bottle inlet aperture 22; and an organics inlet aperture 24. Each inlet is connected to an associated removable collection container via a discrete passage. For example, the coloured glass inlet aperture 14 is connected to an associated coloured glass collection container 26 via a coloured glass passage 28. The coloured glass passage 28 has a coloured glass compaction compartment 30. Similarly, there is a clear glass compaction compartment 32; a cans compaction compartment 34; a mixed plastics compaction compartment 36; and a plastic bottle compaction compartment 38. The compaction compartments are connected so as to be driven simultaneously by a single hydraulic ram 40.

The six inlet apertures are located in an upper drawer 42. The Inlet apertures can only be accessed by opening the upper drawer 42. The upper drawer 42 is hinged, such that the inlet apertures are accessed by tilting the upper drawer 42 forwards. When the upper drawer 42 is closed, the inlet apertures are inaccessible, as can be seen in FIG. 3. The act of closing the upper drawer 42 helps feed waste into the respective compaction compartments under gravity.

The collection containers are housed within a lower drawer 44, as can be seen from FIG. 3. The containers are configured to receive corresponding waste from the respective compaction compartments. For example, a plastic bottle container 46 is formed so as to have an opening directly underneath the plastic bottle compaction compartment 38, when both the upper drawer 42 and the lower drawer 44 are closed. When both drawers 42, 44 are closed, waste can be compacted and fall into the container underneath.

The waste processor 10 further comprises a chassis 47 as shown in FIG. 1. The chassis 47 supports the upper drawer 42, the lower drawer 44 and the hydraulic ram 40. The waste processor 10 has similar outer dimensions as other kitchen units. The hydraulic ram 40 is supported on the chassis 47 in a volume out with an arc prescribed by the movement of the upper drawer 42.

Figure 4:
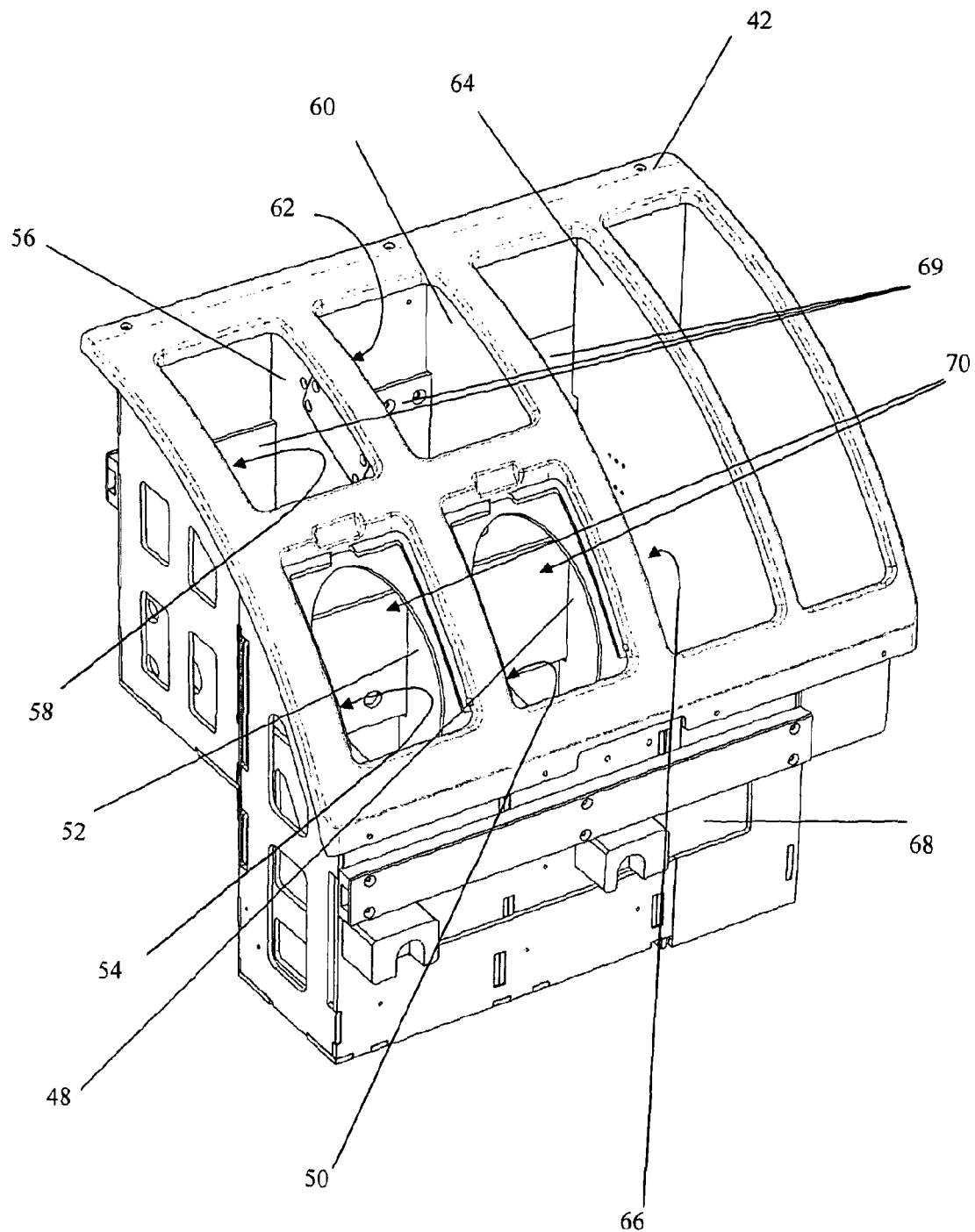
FIG. 4 is a cut away perspective view of the waste receiving module of FIG. 1 shown in a waste receiving configuration.
Figure 5:
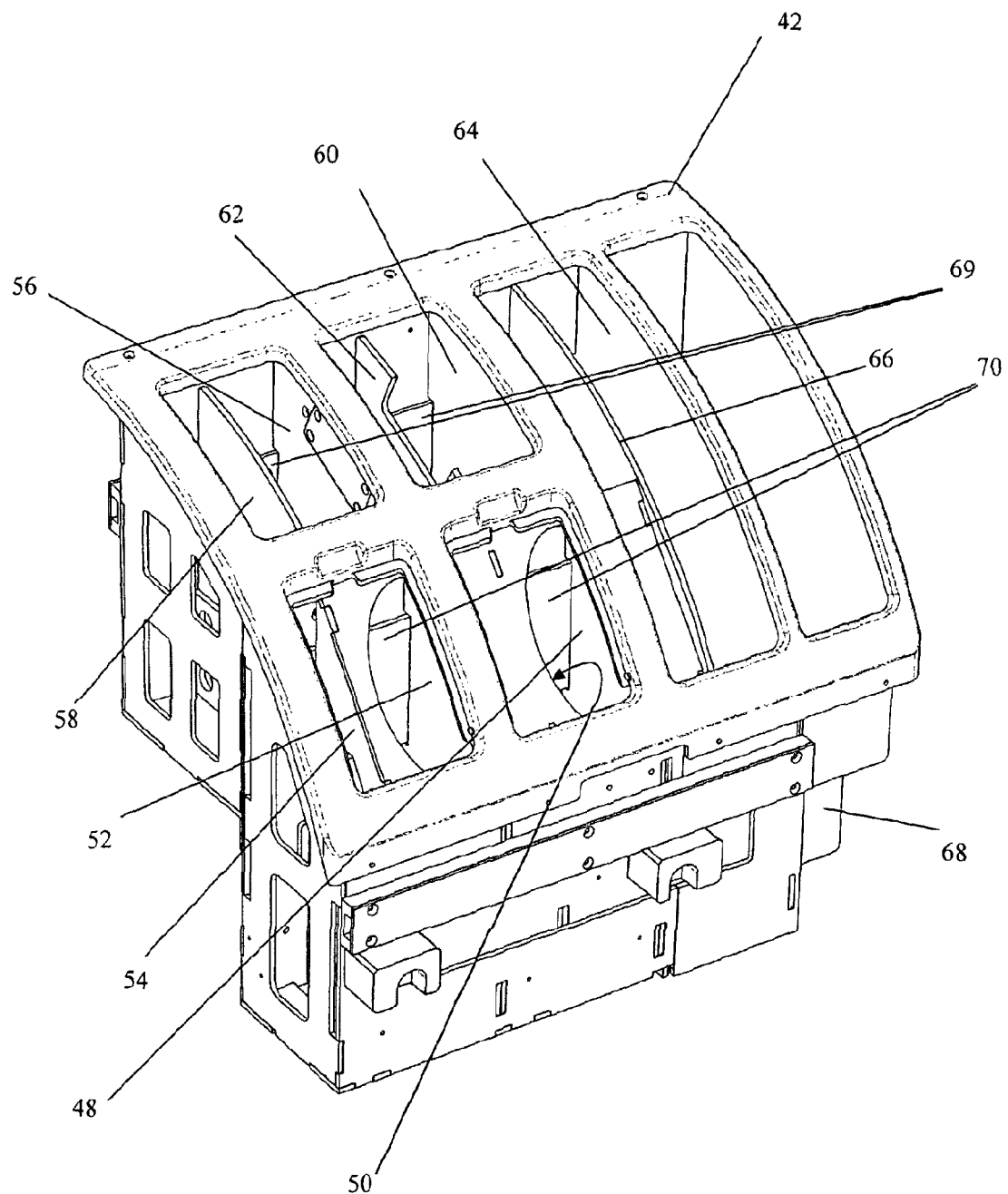
FIG. 5 is a cut away perspective view of the waste receiving module of FIG. 1 shown in a waste compacting configuration.
Figure 6:
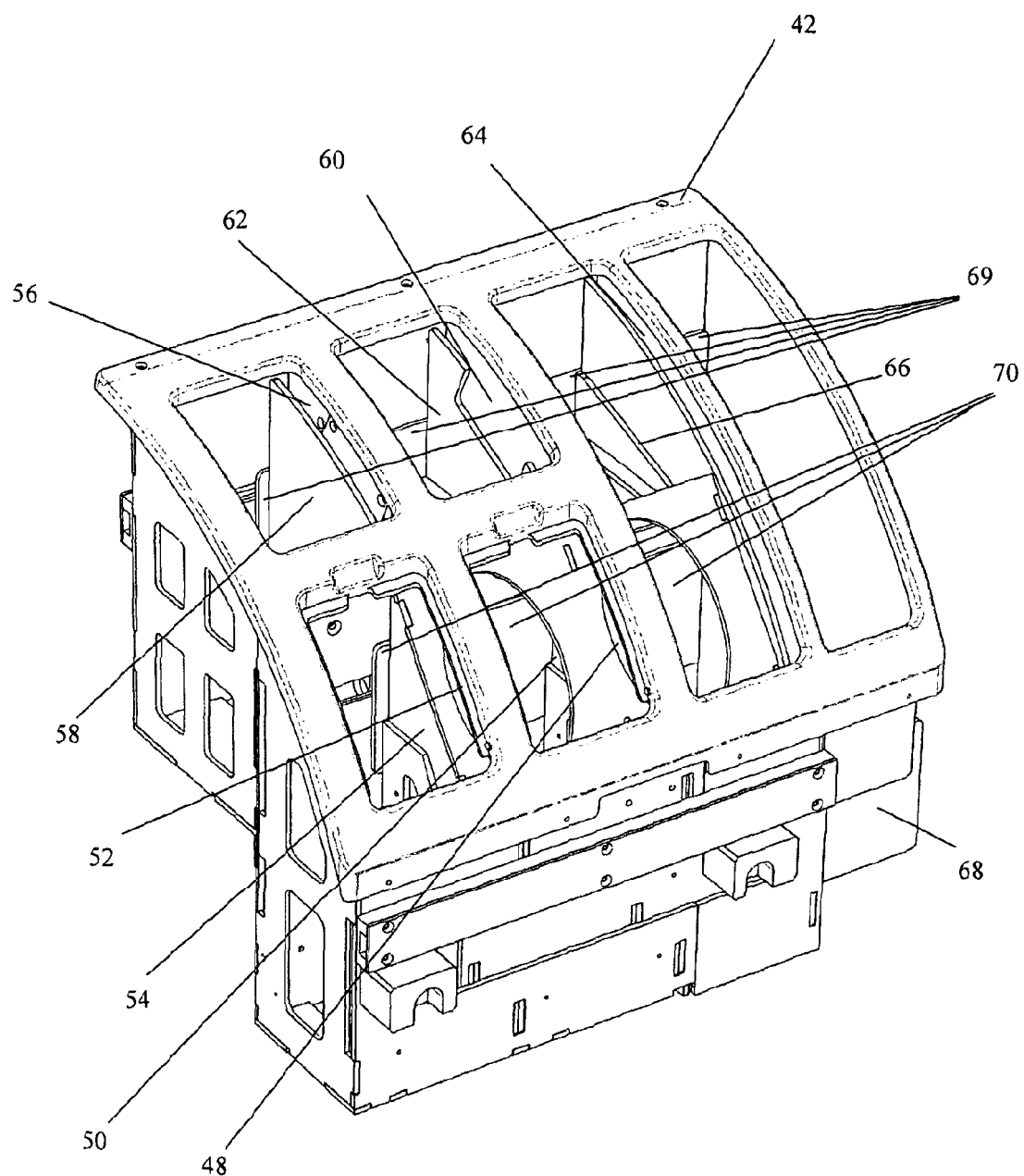
FIG. 6 is a cut away perspective view of the waste receiving module of FIG. 1 shown in a waste compacted configuration.

FIGS. 4, 5 and 6 show the progression of compaction within each compaction compartment. Each compaction compartment includes a fixed compaction plate and a movable compaction plate. In the embodiment shown, there is: a fixed coloured glass compaction plate 48 and a movable coloured glass compaction plate 50; a fixed clear glass compaction plate 52 and a movable clear glass compaction plate 54; a fixed can compaction plate 56 and a movable can compaction plate 58; a fixed mixed plastic compaction plate 60 and a movable mixed plastic compaction plate 62; a fixed plastic bottle compaction plate 64 and a movable plastic bottle compaction plate 66. The movable compaction plates are connected by a transmission plate 68 and support plates 69, 70. FIG. 4 shows the movable compaction plates in a deactivated position. The compaction plates do not obstruct the inlet apertures, such that waste is received in the compaction compartments, between the movable compaction plates and the fixed compaction plates.

FIG. 5 shows the movable compaction plates in a first compacting position. The separation between each movable compaction plate and the corresponding fixed compaction plate has been reduced. Waste in the compaction compartments has been compacted to waste with a maximum thickness corresponding to the separation between the movable and fixed plates. Some waste may be reduced to a smaller thickness, for example a clear glass bottle may be shattered by the movement of the clear glass movable compaction plate from the position of FIG. 4 to the position of FIG. 5.

FIG. 6 shows the movable compaction plates in a final compacting position. The separation between each movable compaction plate and the corresponding fixed compaction plate has been further reduced. Waste is compacted between the plates and may be gripped between the plates, retaining the waste in the compartment. In the embodiment shown, the moveable compaction plates are rigidly connected to each other by the support plates 69, 70 and the transmission plate 68 such that each type of waste is compacted to comprise a similar maximum thickness during each compaction cycle.

Figure 7:
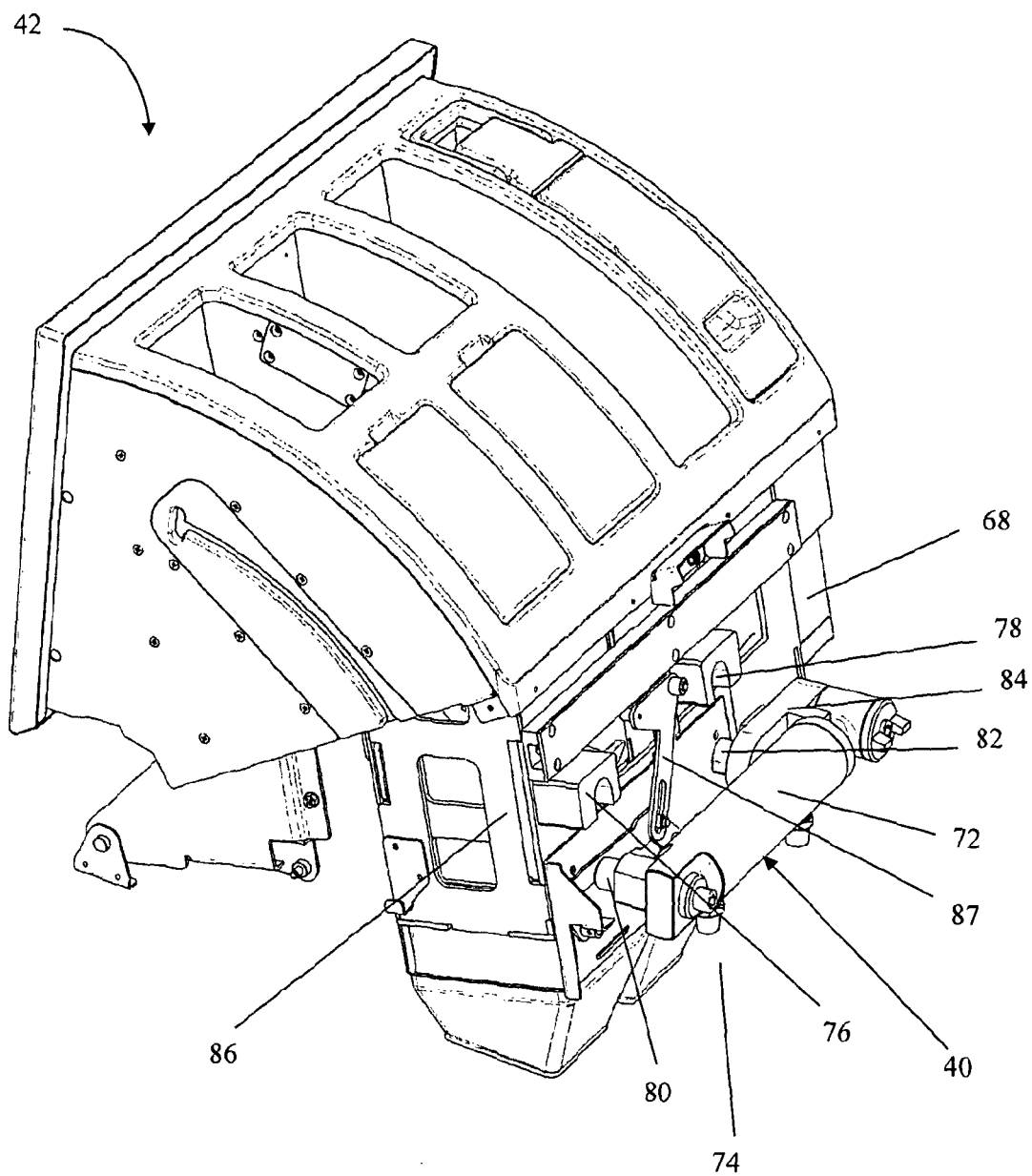
FIG. 7 is a rear perspective view of the inlet drawer of FIG. 1 showing a drive transmission system with a hydraulic ram in isolation.
Figure 8:
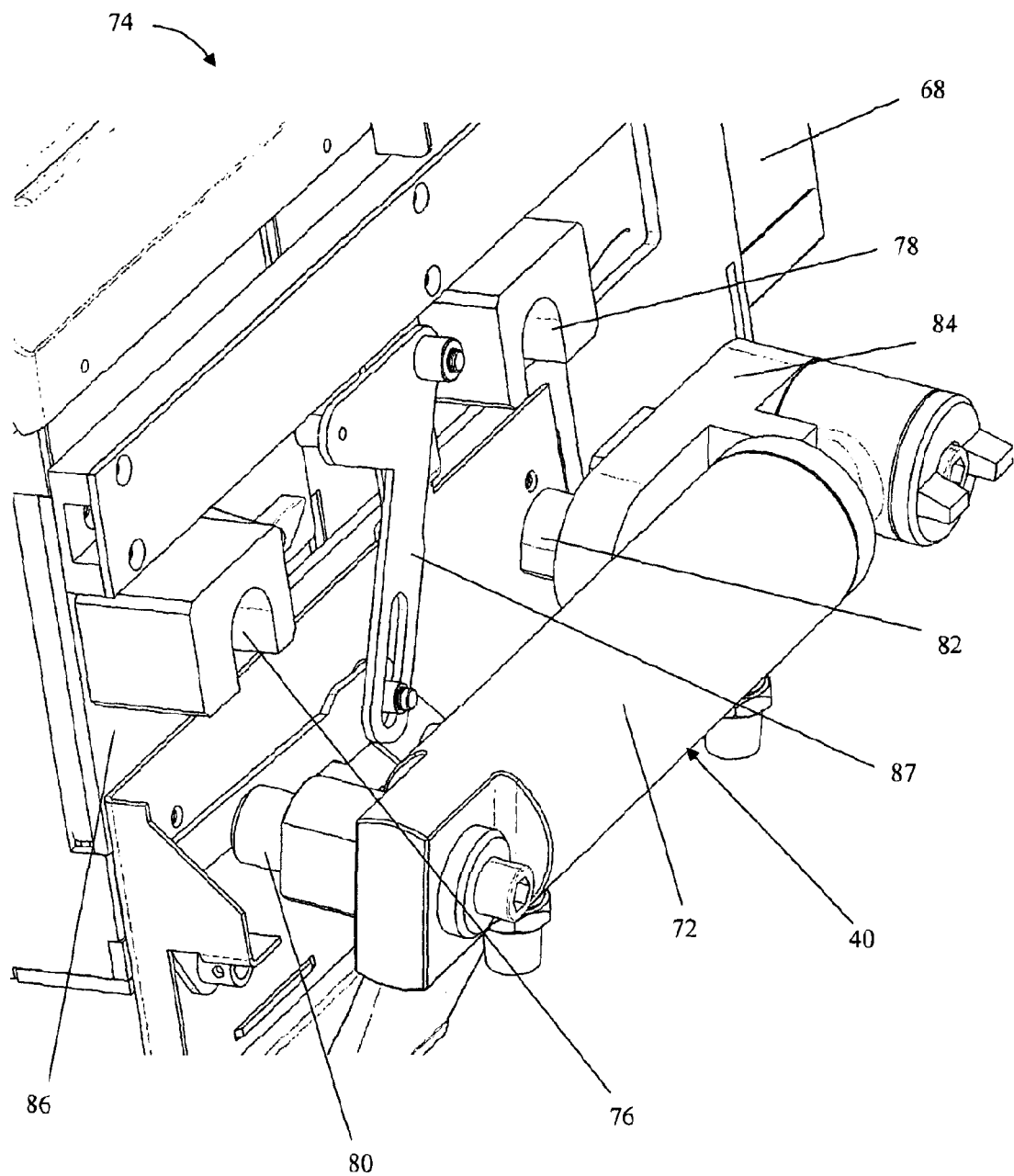
FIG. 8 is a detail view of FIG. 7.

FIG. 7 and FIG. 8 illustrate rear perspective views of the upper drawer 42 together with a hydraulic ram cylinder 72 in isolation showing a transmission system 74 disconnected from the hydraulic ram cylinder 72. The transmission system 74 includes a static connector 76 and a dynamic connector 78. The static connector 76 is coupled to a static node 80 of the hydraulic ram 40 and the dynamic connector 78 is coupled to a dynamic node 82 on the cylinder head 84, when the upper drawer 42 is in the closed position. When the upper drawer 42 is opened the connectors 76, 78 decouple. The static connector 76 is rigidly connected to the body 86 of the upper drawer 42. The dynamic connector 78 is rigidly connected to the transmission plate 68 such that movement of the head 84 causes the transmission plate 68 to translate relative to the drawer body 86. The movement of the transmission plate 68 is linearly guided such that the multiple movable compaction plates simultaneously translate. The transmission plate 68 is further coupled to flaps and hatches, separating the collection containers from the compaction compartments, via a linkage member 87. Movement of the transmission plate 68 from a first inactive position to a second compacting position causes the linkage member 87 to open the flaps and the hatches. Upon completion of a compaction stroke, the transmission plate 68 returns to the first position. Whilst the transmission plate 68 translates back to the first position, the linkage member 87 retains the flaps and the hatches in an open position. As the transmission plate 68 reaches the first position, the linkage member 87 returns to its first position. The flaps and the hatches thus remain open for a time period after completion of the compaction stroke and return of the compaction plates is started, such that compacted waste is able to pass through the open flaps and the open hatches to the corresponding containers underneath. Thereafter the flaps and the hatches return to the closed position, trapping subsequent uncompacted waste in the compaction compartments and also separating the collection containers from the inlet apertures, thus reducing the transfer of, for example, odours.

Figure 9:
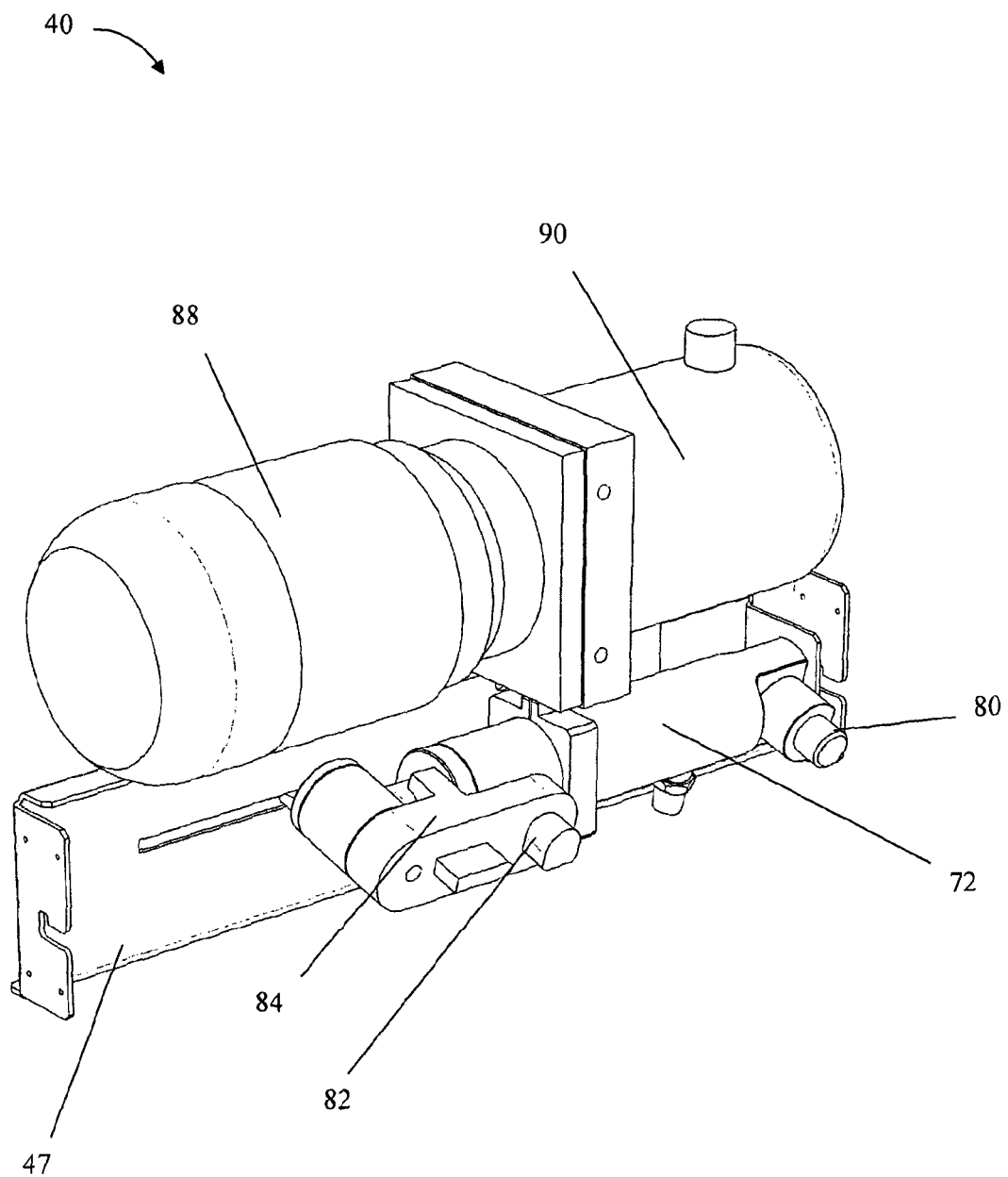
FIG. 9 is a cutaway perspective view of a drive system of the waste processor of FIG. 1.
Figure 10:
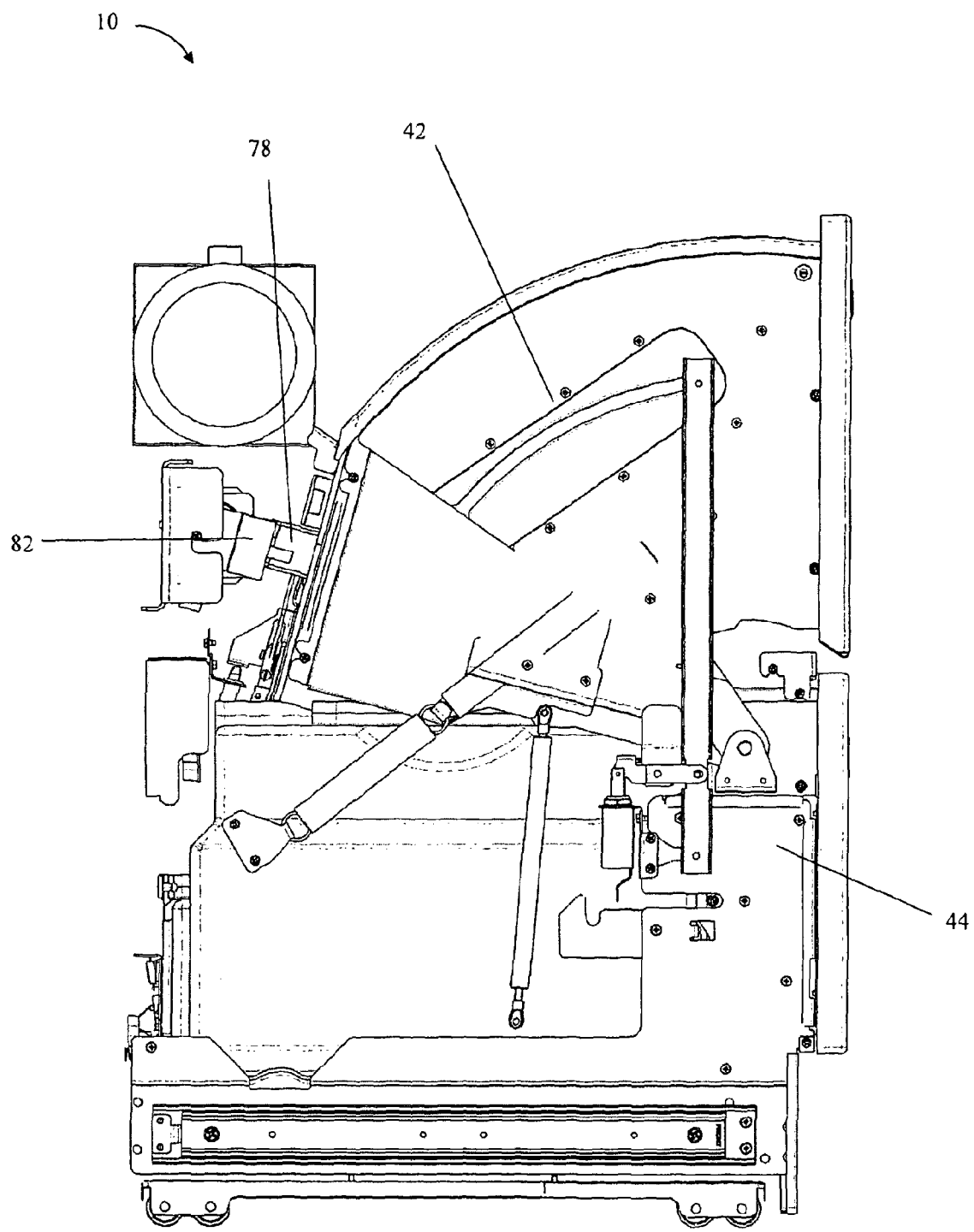
FIG. 10 is a cutaway side view of the waste processor of FIG. 1 with the hydraulic ram connected to the transmission.
Figure 11:
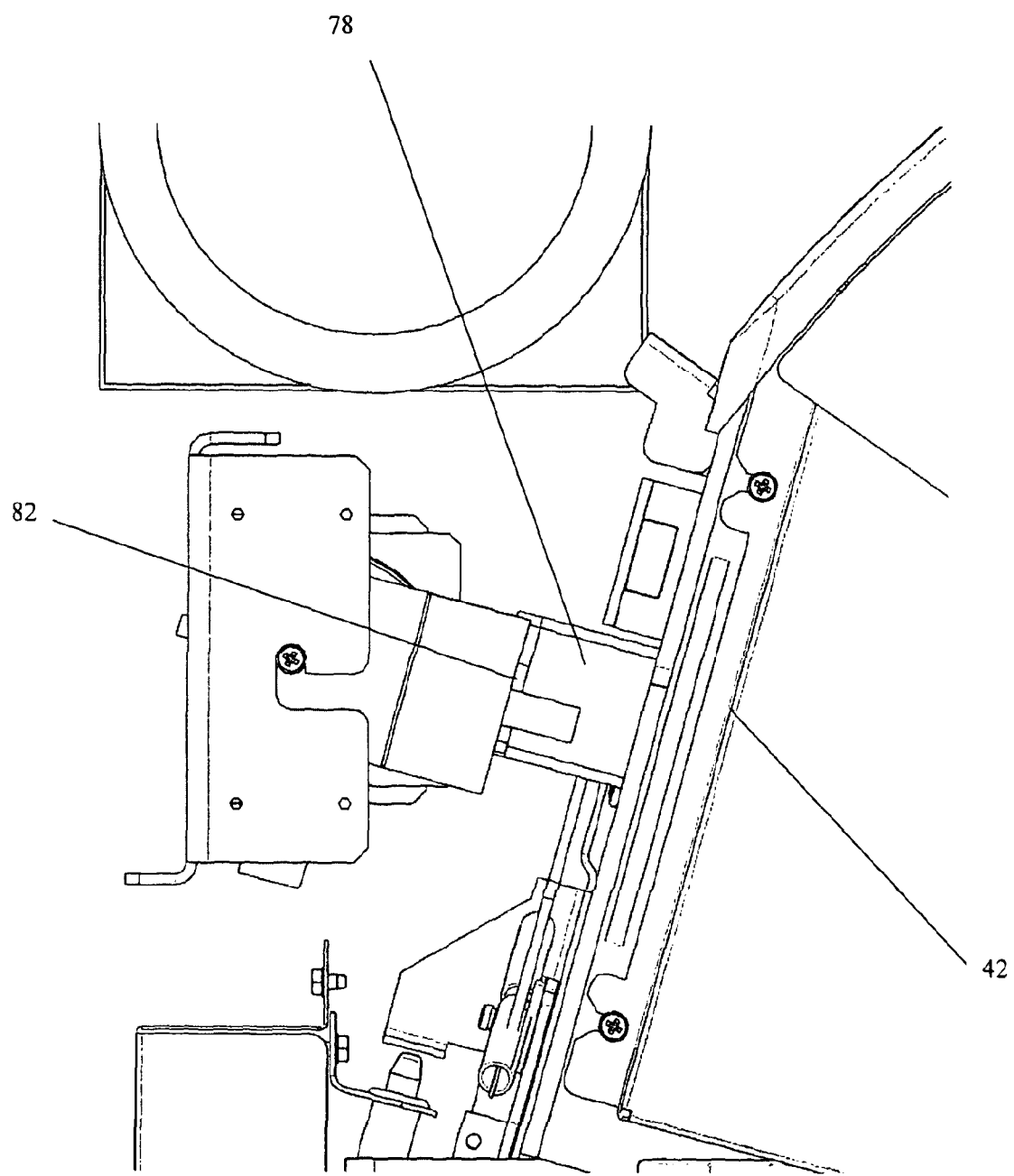
FIG. 11 is a detail view of FIG. 10.
Figure 12:
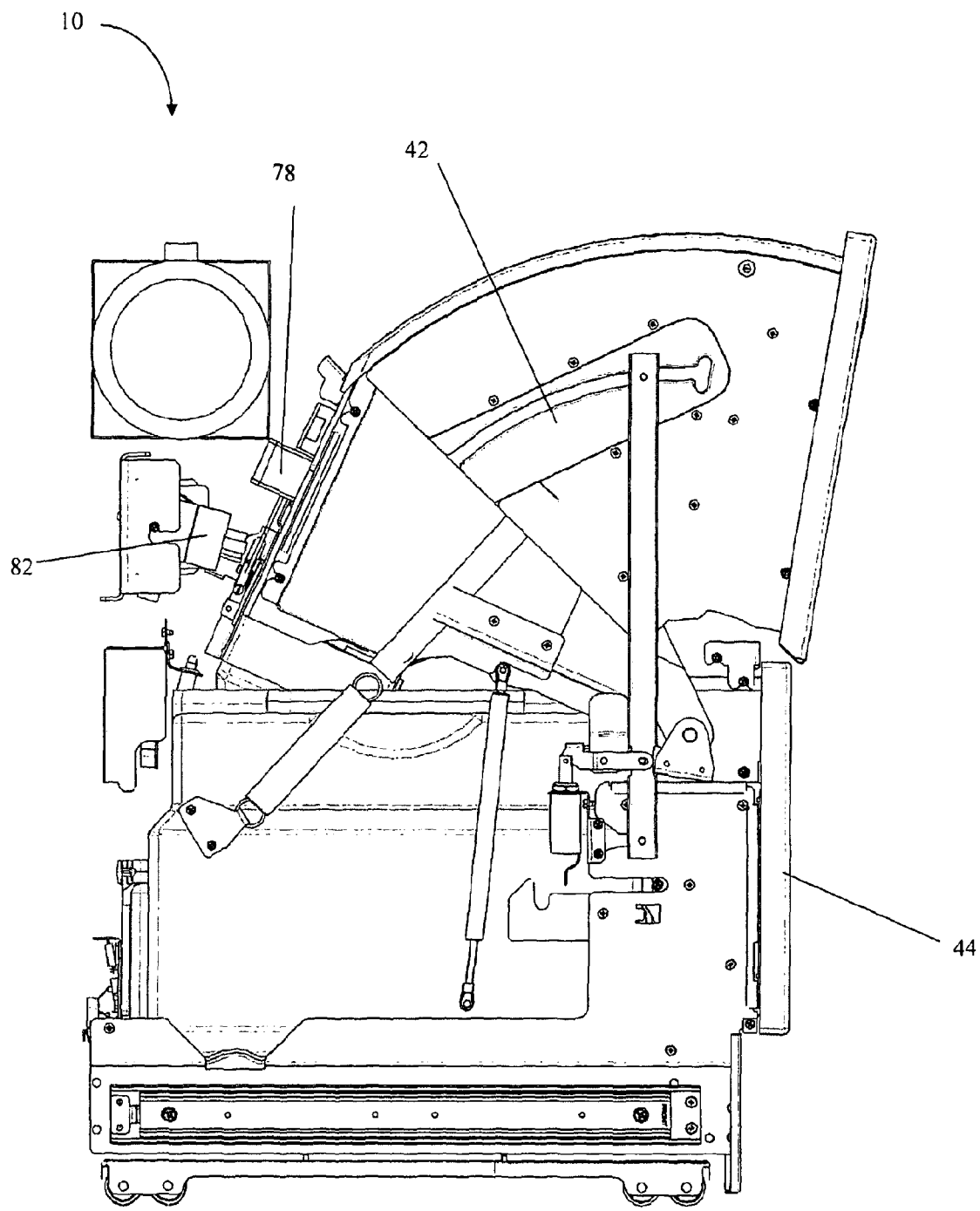
FIG. 12 is a cutaway side view of the waste processor of FIG. 1 with the hydraulic ram disconnected from the transmission.
Figure 13:
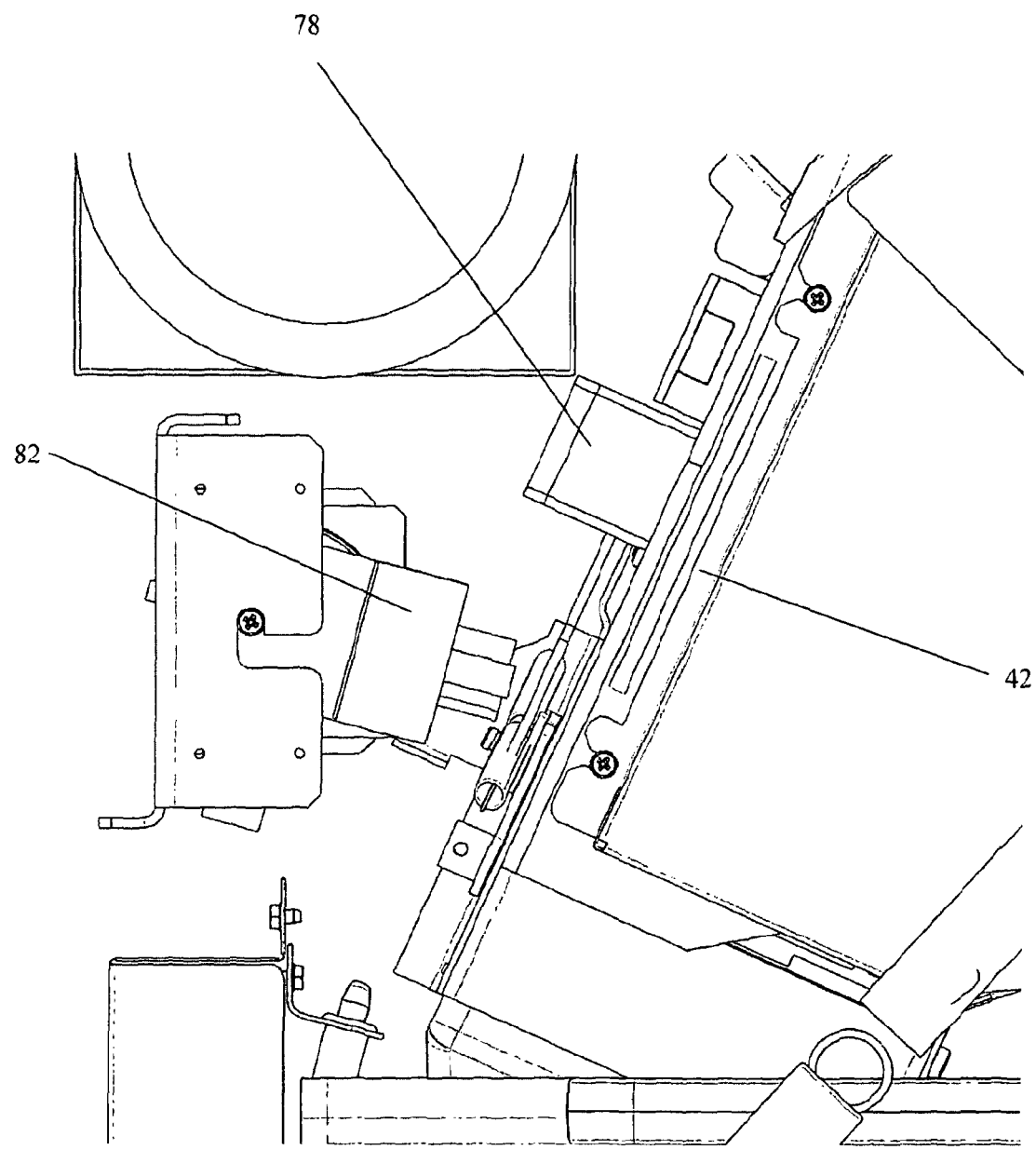
FIG. 13 is a detail view of FIG. 12.

FIG. 9 shows the hydraulic ram 40 in isolation, disconnected from the transmission system 74. The hydraulic ram 40 is mounted on the chassis 47 and comprises a reservoir 90, a pump 88 and the cylinder 72. The cylinder head 84 extends horizontally and comprises a dynamic node 82 configured for releasable connection to the transmission system 74. The cylinder 72 and the transmission system 74 are configured to be coupled together by both the dynamic node 82 and the static node 80 when the upper drawer 42 is in the closed position, as shown in FIG. 10, and in more detail in FIG. 11. Opening the upper drawer 42 raises the transmission system 74 such that the transmission system 74 is disconnected from the cylinder 72 when the upper drawer 42 is open, as can be seen in FIG. 12, and in more detail in FIG. 13. Should the hydraulic ram 40 be activated with the upper drawer 42 in the open position, the cylinder head 84 extends, however does not connect such that no drive is transmitted to the transmission system 74. Consequently, the compaction plates cannot be activated when the inlet apertures are accessible, preventing possible injury to hands inserted through the apertures by compaction and also preventing debris exiting through the inlet apertures during compaction.

Figure 14:
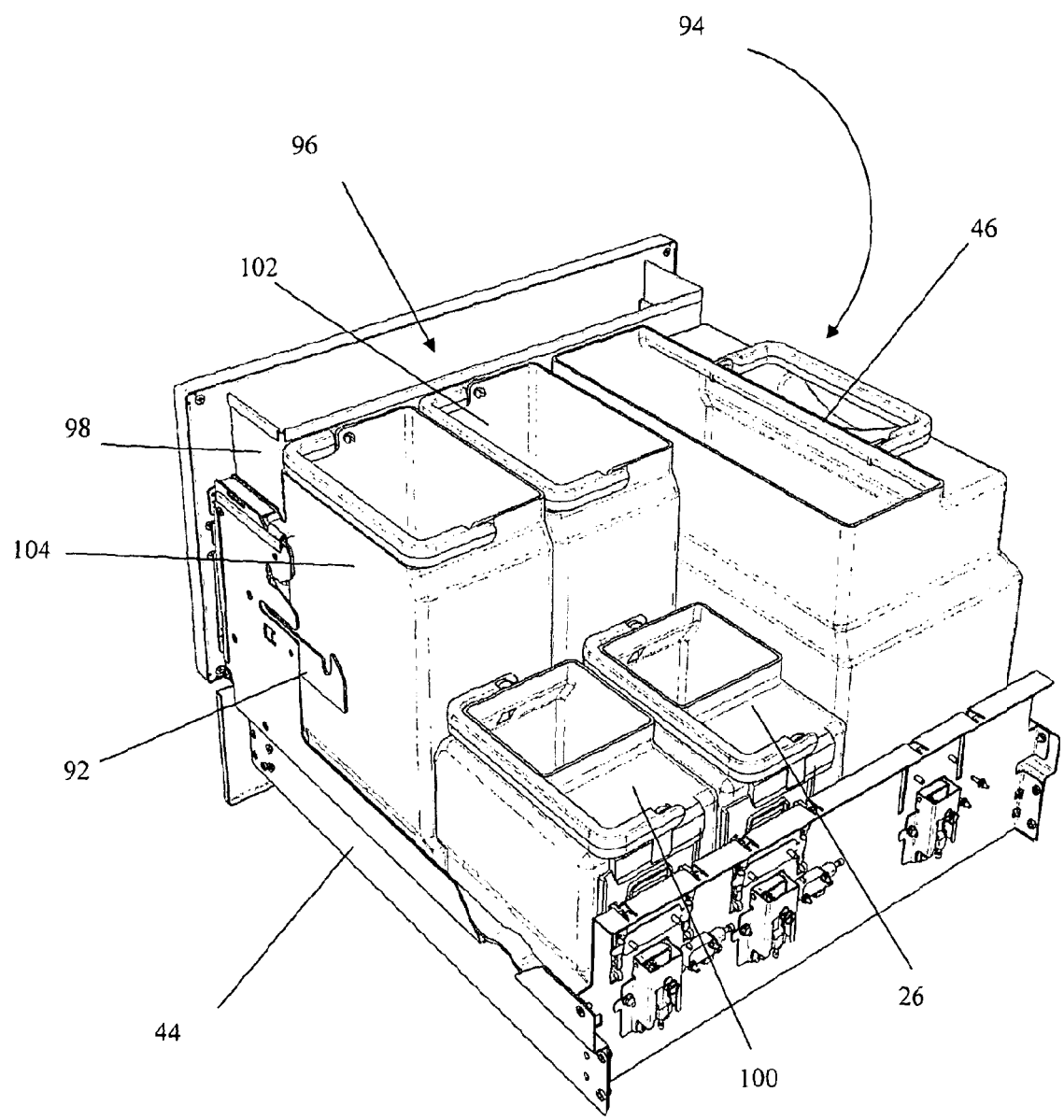
FIG. 14 is a cutaway perspective rear view of the collection drawer of the waste processor of FIG. 1.

FIG. 14 illustrates a safety feature of the lower drawer 44. Two spring-loaded latches 92, 94 are located either side of the lower drawer 44. Opening of the drawer 44 is restricted by the latches 92, 94 to a first open position. The latches 92, 94 are accessible in the first open position such that the latches 92, 94 may be depressed, enabling further opening of the lower drawer 44 to a second open position. The removable containers are only accessible with the lower drawer 44 in the second position such that access to the containers for children is restricted, improving safety. In the embodiment shown, both latches 92, 94 must be depressed to allow the lower drawer 44 to open to the second position. Requiring both latches 92, 94 to be depressed makes accessing the containers more difficult for children, further increasing safety. In an alternative embodiment (not shown), the latches are mechanically linked such that depressing one latch manually causes the other latch to be depressed. In the first open position a waste paper inlet 96 is accessible. Waste paper or card can be inserted into a waste paper compartment 98. In the second open position, further collection containers are accessible. The waste paper compartment 98 is hinged at the bottom such that opening the lower drawer 44 to the first position opens the waste paper inlet 96 by translation and further by rotation of front and rear waste paper compartment walls with respect to each other. The additional opening of the waste paper inlet 96 by hinging causes substantially flat waste, such as card, already present in the waste paper compartment 98 to be fanned open. Spreading out the waste in the waste paper compartment 98 eases the insertion of further waste, particularly if the waste is substantially flat, such as card or a cereal box. When the lower drawer 44 is pushed closed, the front and rear waste paper compartment walls are pushed towards each other, thus compressing the waste inserted in the waste paper compartment 98. When the lower drawer 44 is closed, the front and rear waste paper compartments cannot rotate with respect to each other such that compacted waste cannot open the waste paper inlet 96. The containers comprise individual handles such that the containers may be separately removed from the collection drawer. The handles are hinged such that, when located or relocated in the collection drawer the handles do not obstruct the container openings, allowing passage of compacted waste into the containers. As can be seen from FIG. 14, the containers at the rear of the collection drawer, the coloured glass container 26 and a clear glass container 100 are shorter than the containers to the front of the collection drawer, namely the mixed plastics container 102 and the cans container 104. The size of the containers corresponds to the relative volumes of waste accumulated. For example, the compacted glass occupies a small volume such that a relatively large mass of glass can be accumulated in a smaller container. The weight of the container is restricted by the volume of the container such that the container can be carried by a user when full.

Figure 15:
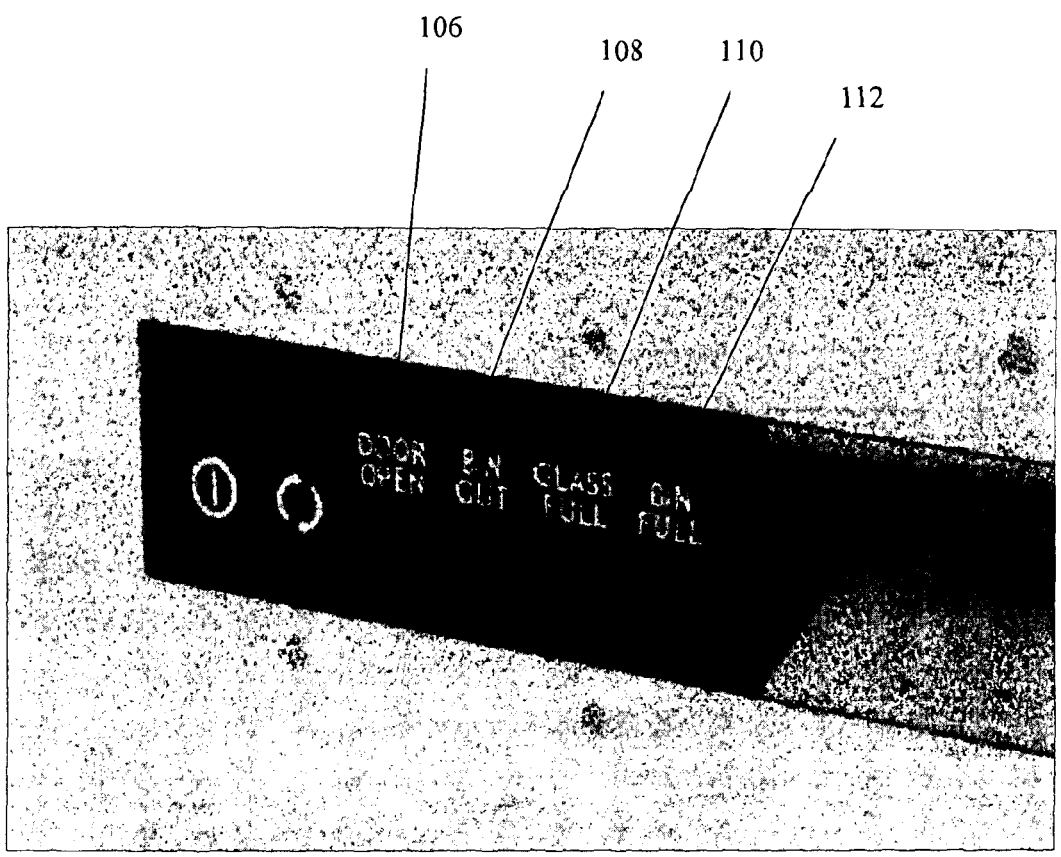
FIG. 15 is a perspective view of an indicator panel of the waste processor of FIG. 1.

FIG. 15 illustrates indicators used for providing status information to a user. The waste processor includes a sensor that detects when the upper drawer is opened which is then indicated by an upper drawer indicator 106. A similar lower drawer indicator 108 is connected to a similar lower drawer sensor. Power to the drive system is correspondingly prevented when either of the drawers is opened. Container full sensors are also provided with corresponding indicators, 110, 112.

Figure 16:
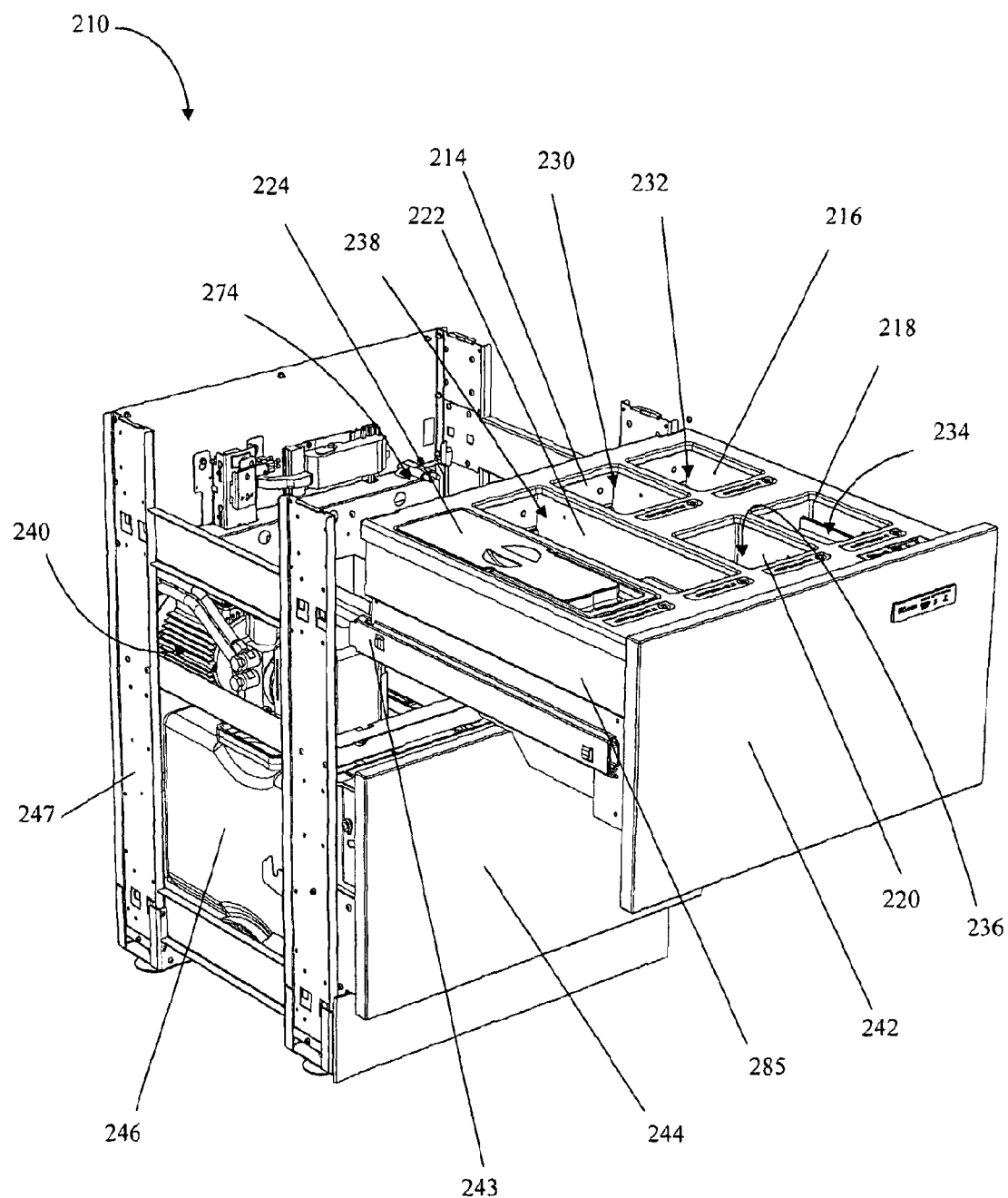
FIG. 16 is a cut away perspective view of another embodiment of a waste processor of the present invention.

FIG. 16 is a perspective view of an alternative embodiment of a waste processor 210 of the present invention. The waste processor 210 shown in FIG. 16 comprises features similar to those shown in FIGS. 1 to 15, and as such like features share like reference numerals, incremented by 200. Accordingly, the waste processor 210 of FIG. 16 includes an upper drawer 242 and a lower drawer 244. In the embodiment shown, instead of being hinged, the upper drawer 242 is a sliding drawer, configured to translate into and out of the housing 212 on runners 243, located either side of the drawer 242. Providing a sliding upper drawer 242 reduces space, in particular vertical space, required for movement of the upper drawer and/or components not directly associated with the intake and/or compaction and/or storage of the waste.

Figure 17:
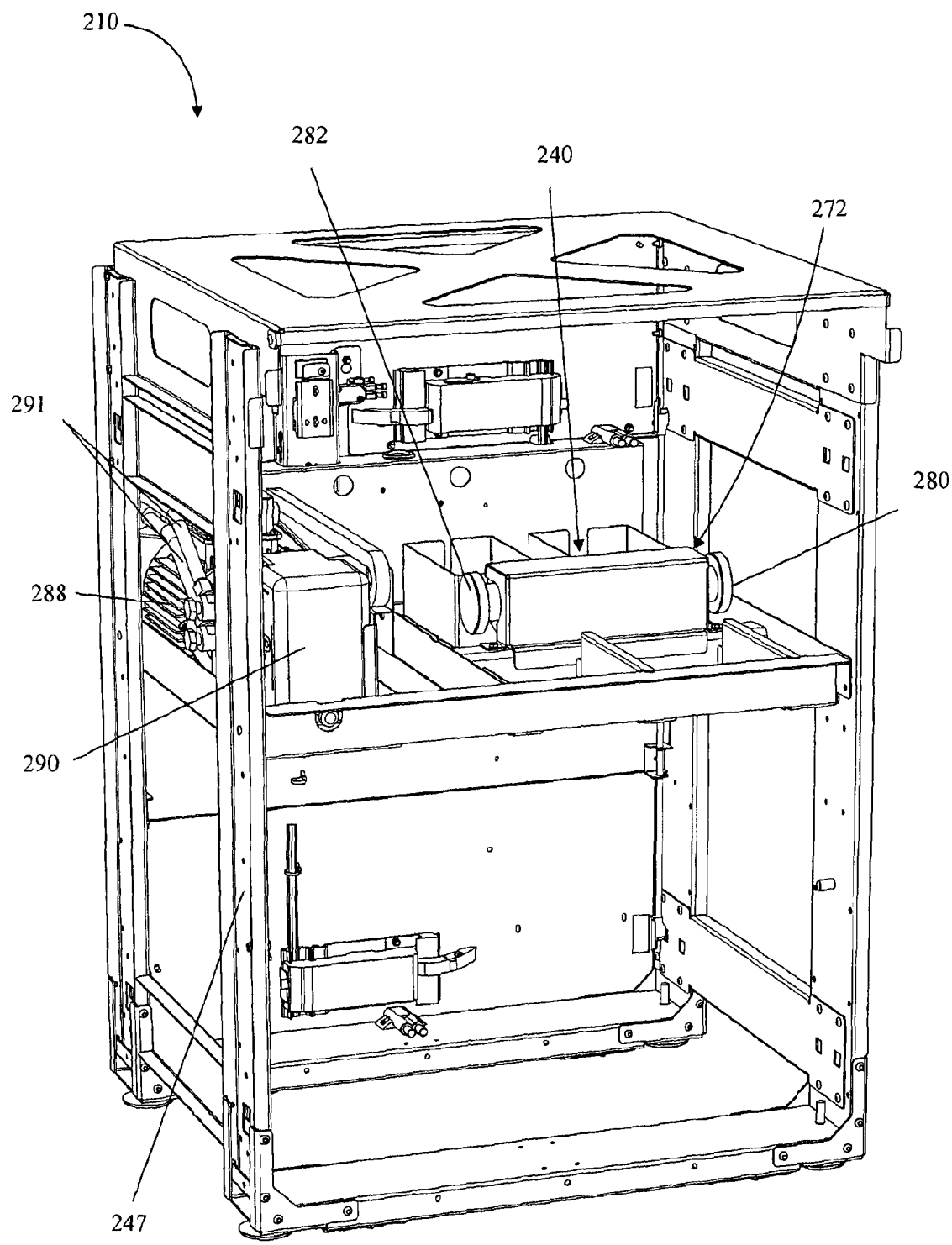
FIG. 17 is a perspective view of the waste processor of FIG. 16, with upper and lower drawers removed.

FIG. 17 shows the chassis 247 in more detail, with the drawers 242, 244 removed. The hydraulic ram 240 shown is mounted to the chassis 247 and comprises a reservoir 290, a pump 288 and a cylinder 272 connected to the reservoir 290 via tubes 291. The cylinder 272 is mounted to the chassis such that the direction of extension of the cylinder is horizontal and perpendicular to the direction of translation of the upper drawer 242.

Figure 18:
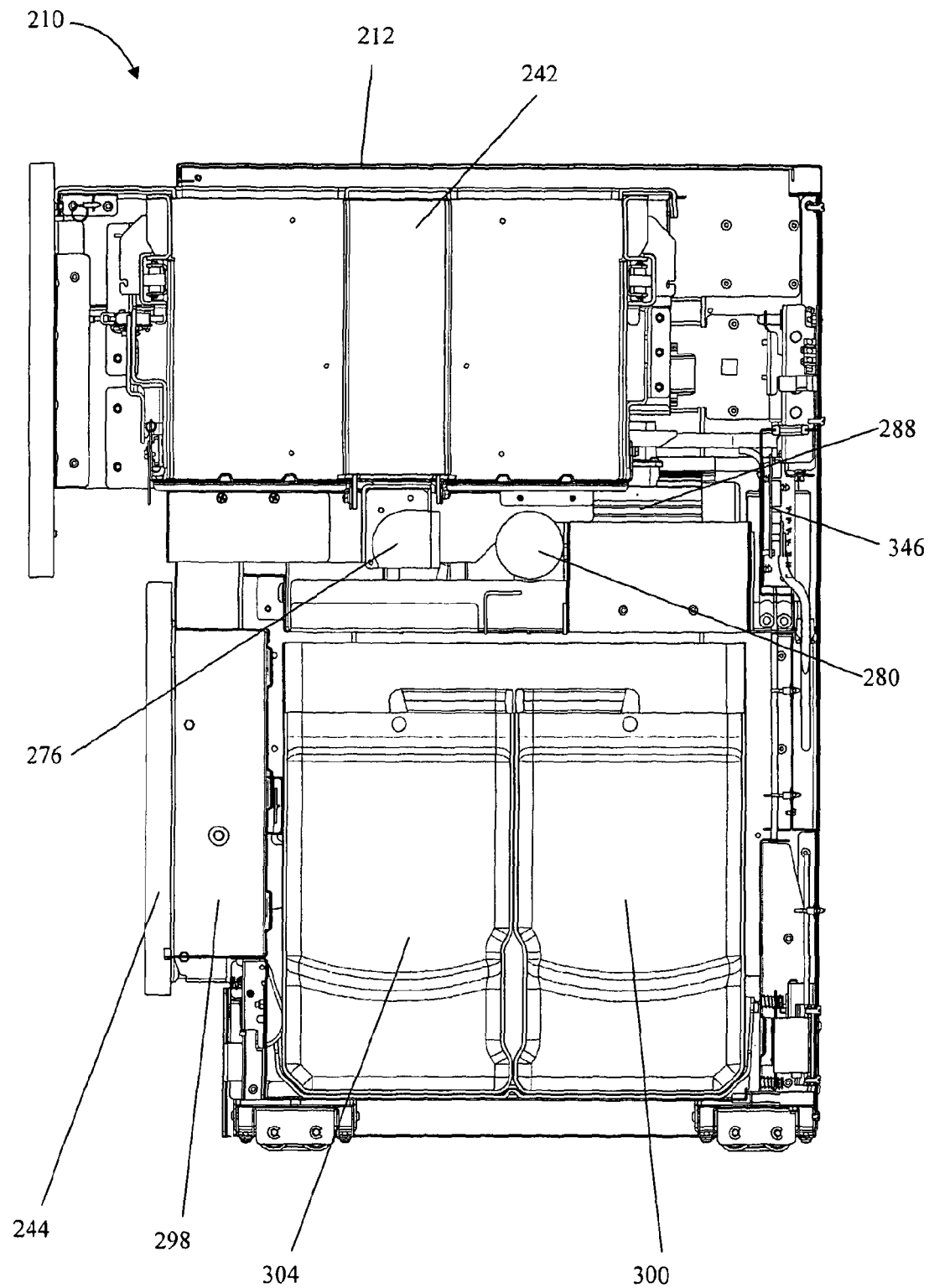
FIG. 18 is a side view of the waste processor of FIG. 16 with the upper drawer shown in a partially open position.

The waste processor 210 is configured such that the cylinder 272 is only coupled to the upper drawer 242 when the upper drawer 242 is in a closed position. In particular, the cylinder comprises static and dynamic ends 280, 282 configured for releasable connection to respective static and dynamic connectors 276, 278 of a transmission system 274 in the upper drawer 242. Opening the upper drawer 242 translates the transmission system 274 such that the transmission system 274 is disconnected from the cylinder 272 when the upper drawer 242 is open, as can be seen in FIG. 18. Should the hydraulic ram 240 be activated with the upper drawer 242 in the open position, the cylinder 272 extends, however does not connect such that no drive is transmitted to the transmission system 274. Consequently, the movable compaction plates 250, 254, 258, 262, 266 cannot be activated when the inlet apertures 214 to 224 are accessible, preventing possible injury, such as to hands inserted through the apertures 214 to 224 by compaction and also preventing debris exiting through the inlet apertures 214 to 224 during compaction. The waste processor 210 comprises an upper drawer open sensor in any event to prevent activation of the hydraulic ram 240 when the upper drawer 242 is open.

Figure 19:
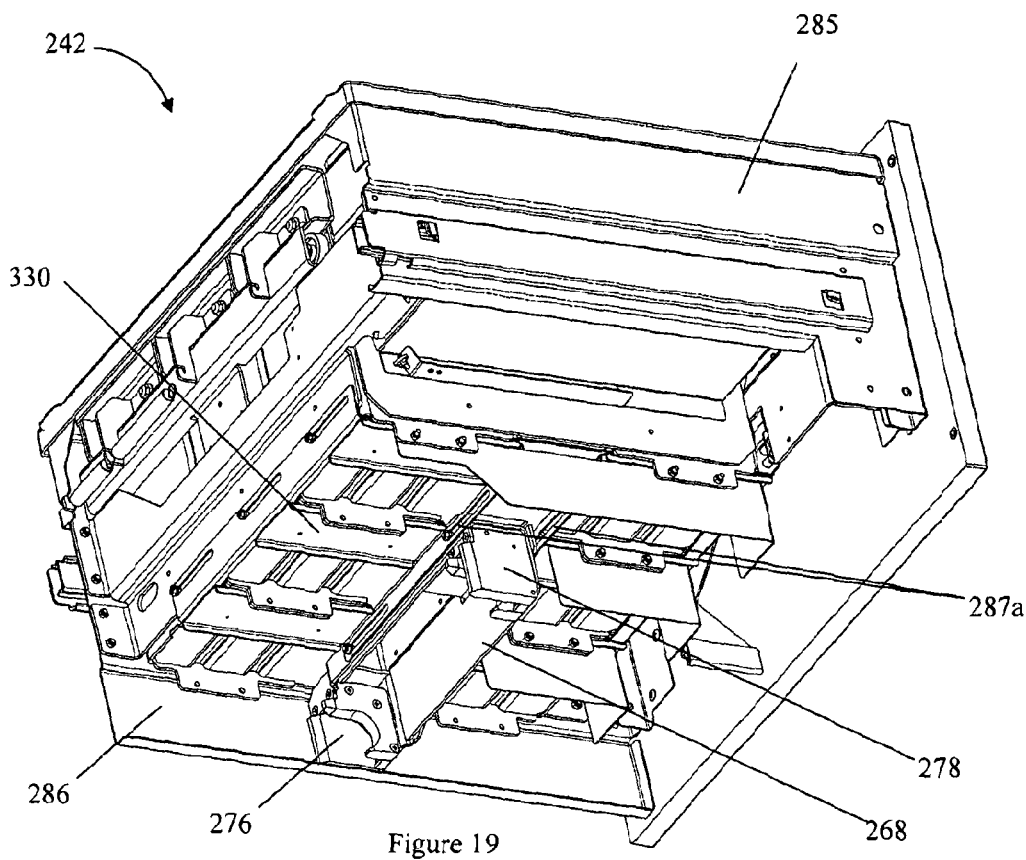
FIG. 19 is a perspective view of the upper drawer of the waste processor of FIG. 16 in isolation.
Figure 20:
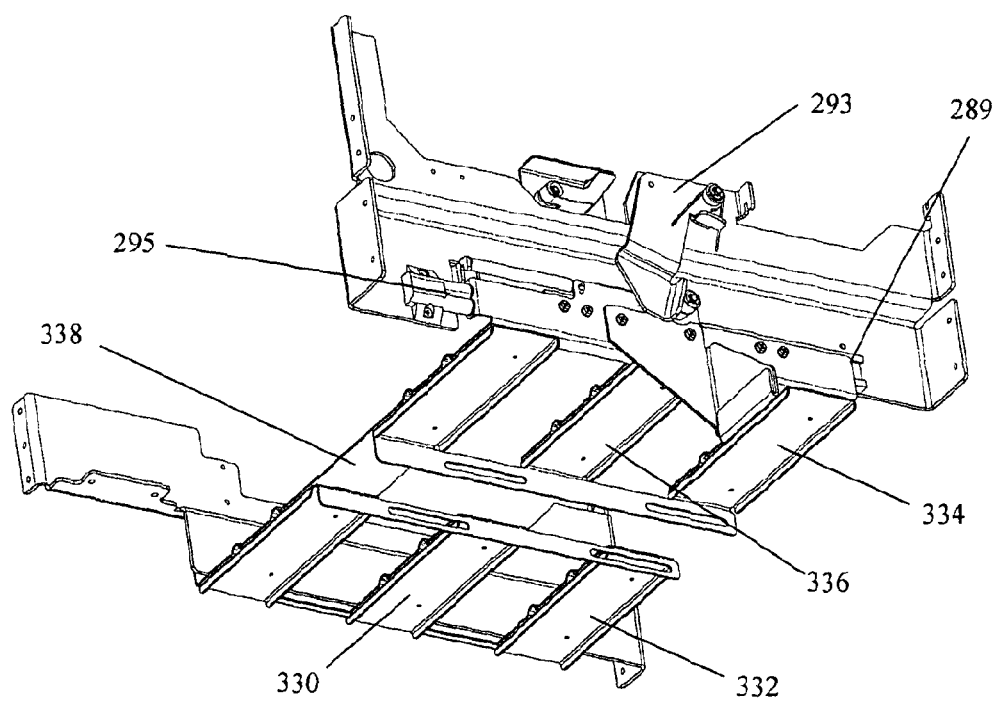
FIG. 20 is a perspective view of a flap system of FIG. 19 in isolation.

The static connector 276 is coupled to the static end 280 of the hydraulic ram 240 and the dynamic connector 278 is coupled to the dynamic end 282 on the cylinder 272, when the upper drawer 242 is in the closed position. The static connector 276 is rigidly connected to the static compaction plates 248, 252, 256, 260, 264. The static and movable compaction plates 248 to 266 are separated from respective left and right sides 285, 286 of the upper drawer 242 by a gap such that the sides 285, 286 of the upper drawer are isolated from crushing forces. The dynamic connector 278 is rigidly connected to a transmission plate 268 such that movement of the dynamic cylinder end 282 causes the transmission plate 268 to translate relative to the static compaction plates, 252, 256, 260, 264. The movement of the transmission plate 268 is linearly guided such that the multiple movable compaction plates simultaneously translate. The transmission plate 268 is further coupled to flaps and hatches, separating the collection containers from the compaction compartments, via linkage members 287a, as shown in FIG. 19. FIG. 20 shows a detailed view of the flaps in isolation of the compaction compartments. The movement of the flaps is defined by a guide rail 289, a sprung hinge 293 and a damping mechanism 295. The flaps 330, 332, 334, 336 and 338 correspond to the respective compaction compartments 230, 232, 234, 236 and 238. The flaps 330 to 338 ensure that only compacted waste passes to the respective collection containers 226, 246, 300, 302 and 304.

Figure 21A:
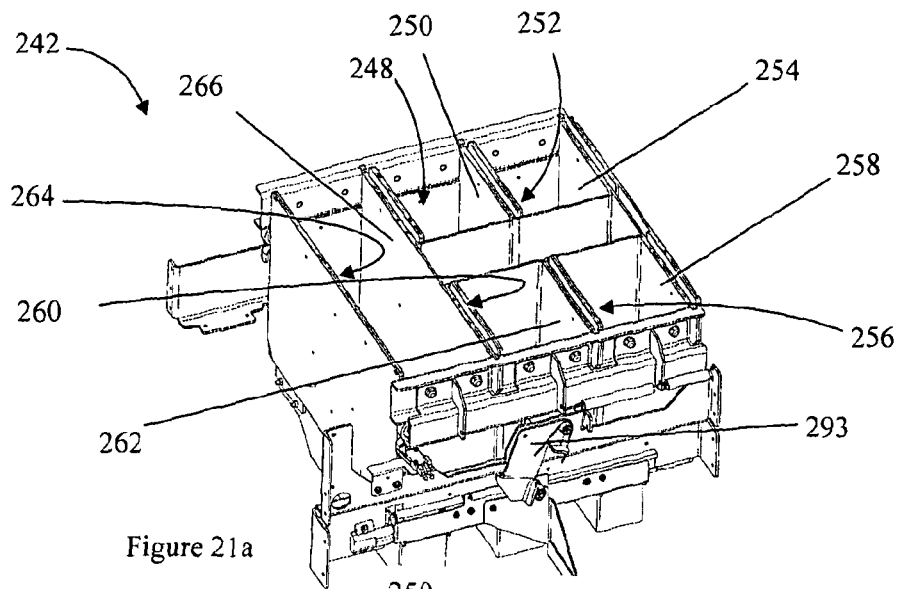
FIGS. 21a to c are perspective views of the compaction compartments of the waste processor of FIG. 16 shown various stages of compaction.
Figure 21B:
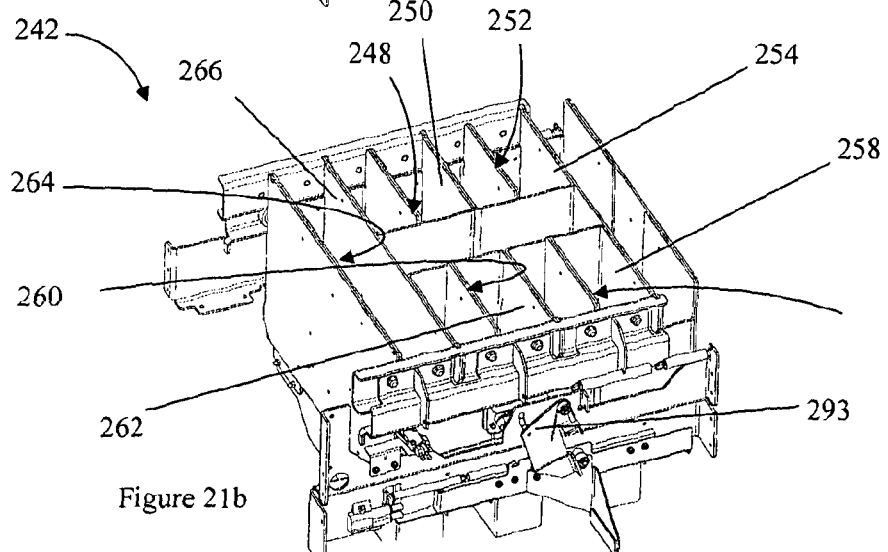
Figure 21C:
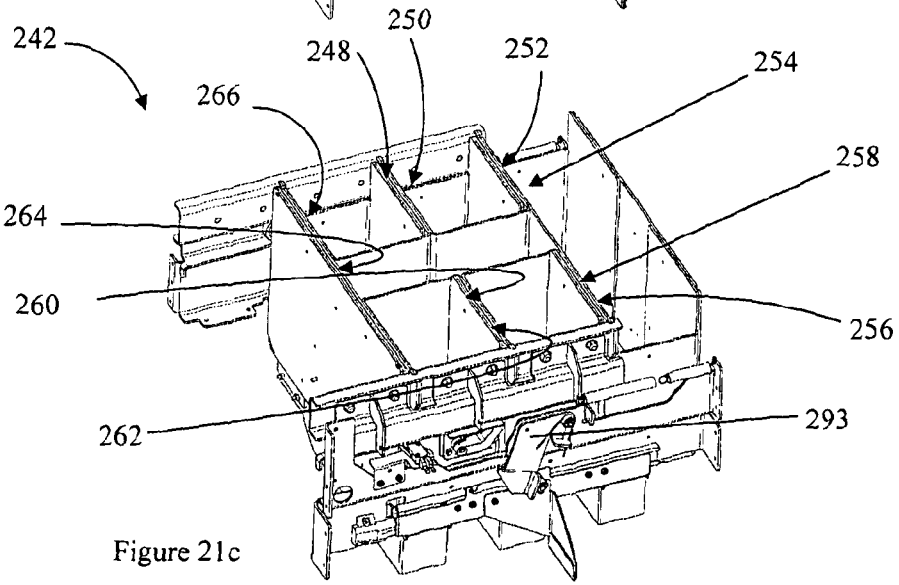

FIGS. 21a, 21b and 21c show the compaction plates in open, partial compaction and full compaction configurations respectively; similar to FIGS. 4, 5 and 6. The corresponding flaps are cycled between closed, open and closed positions during the compaction cycle, such that waste is retained prior to compaction and subsequently allowed to drop through to the collection containers when compacted.

Figure 22:
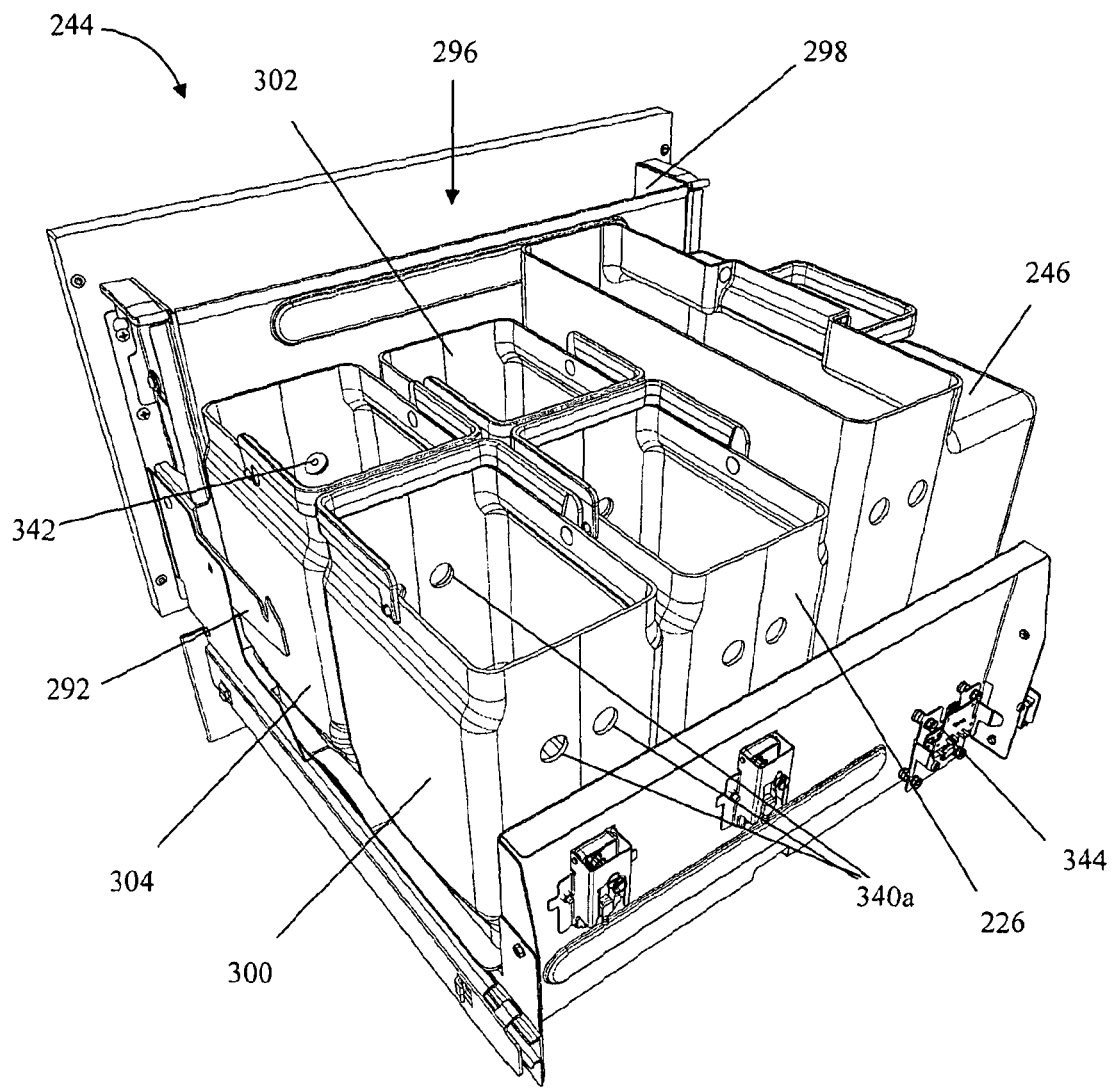
FIG. 22 is a perspective view of the lower drawer of the waste processor of FIG. 16 in isolation.

FIG. 22 shows the collection drawer in more detail. In particular, the respective containers comprise aligned apertures 340a. Accordingly, a signal, such as a light beam, may pass through adjacent containers to a container full sensor 342. Each container comprises two pairs of apertures on opposite sides to allow measurement of waste in either or both sides of the container. Measurement of waste in both or either side of the container enables the determination of whether the container is full and/or whether waste is unevenly distributed within the container. The sensor 342 transmits a signal through a connector 344 to a control unit 346 (shown in FIG. 18). When a container is full, the control unit 346 sends a signal to a container full indicator and also prevents activation of the hydraulic ram 240.

It should be understood that the embodiments described herein are merely exemplary and that various modifications may be made thereto without departing from the scope of the invention. For example, although shown here with hydraulic rams, the waste processor may use a motor, such as an electric motor. Similarly, although shown here with linear translation, the compaction means may rotate a screw, such as with a reducing screw pitch, to compact the waste.

The invention claimed is:

1. A waste processor, for a plurality of different types of waste, comprising:
   a housing having a plurality of inlet means connected to a respective collection zone;
   passage means between each said inlet means and said respective collection zone, each said passage means having a discrete compaction means formed and arranged for effective compaction of said type of waste associated with said inlet means and said respective collection zones;
   wherein said inlet means and associated passage means are in a form of a drawer having a plurality of apertures corresponding to said inlet means, said drawer being formed and arranged to open out of said housing so as to present said plurality of apertures for receiving waste material;
   said plurality of discrete compaction means being coupled by a transmission system to a single drive means; and
   wherein the single drive means is only coupled to the compaction means when the inlet means are inaccessible to a user.

2. The waste processor according to claim 1, wherein said discrete compaction means are disconnected from said drive means when said inlet drawer is opened.

3. A waste processor for a plurality of different types of waste, comprising:
   a housing having a plurality of inlet means connected to a respective collection zone;
   passage means between each said inlet means and said respective collection zone, each said passage means having a discrete compaction means formed and arranged for effective compaction of said type of waste associated with said inlet means and said respective collection zones;
   wherein each said compaction means takes the form of a first plate formed and arranged to co-operate with a second plate so that relative movement of said first plate with respect to said second plate causes material therebetween to be crushed;
   said plurality of discrete compaction means being coupled by a transmission system to a single drive means; and
   wherein the single drive means is only coupled to the compaction means when the inlet means are inaccessible to a user.

4. The waste processor according to claim 3, wherein one plate of each of said plurality of compaction means is mounted to a single support structure which is driven by said single drive means.

5. A waste processor for a plurality of different types of waste, comprising:
   a housing having a plurality of inlet means in an inlet module, said plurality of inlet means being connected to a respective collection zone;
   passage means between each said inlet means and said respective collection zone, each said passage means having a discrete compaction means formed and arranged for effective compaction of said type of waste associated with said inlet means and said respective collection zones;
   said plurality of discrete compaction means being coupled by a transmission system to a single drive means; and
   wherein said transmission system is configured such that opening said inlet module disconnects said drive means from said compaction means, such that said single drive means is only coupled to said compaction means when said inlet means are inaccessible to a user.

6. The waste processor according to claim 3, wherein each of the first plates is a moveable plate formed and arranged to cooperate with each corresponding of the second plates, said second plates being fixed plates,
   wherein said moveable plates are connected by a transmission plate and support plates; and
   wherein each of said moveable plates is mounted to a single support structure which is driven by said single drive means.

7. A waste processor for a plurality of different types of waste, comprising:
   a housing having a plurality of inlet means connected to a respective collection zone;
   passage means between each said inlet means and said respective collection zone, each said passage means having a discrete compaction means formed and arranged for effective compaction of a type of waste associated with said inlet means and said respective collection zones;
   said plurality of discrete compaction means mounted to a single support structure which is driven by a single drive means;
   wherein each compaction means takes a form of a moveable plate formed and arranged to cooperate with a fixed plate so that a relative movement of each moveable plate towards each fixed plate causes material therebetween to be crushed; and
   wherein said moveable plates are connected by a transmission plate and support plates.

8. The waste processor according to claim 7, wherein said plurality of discrete compaction means are arranged to be actuated simultaneously by said single drive means.

9. The waste processor according to claim 7, wherein said inlet means are formed and arranged above said compaction means such that gravity introduces a waste item to be processed to said compaction means.

10. The waste processor according to claim 7, wherein said single drive means is configured to be operable only when said inlet means are inaccessible to a user.

11. The waste processor according to claim 10, comprising an inlet module;
   said inlet module comprising said plurality of inlet means connected to a respective collection zone;
   wherein said transmission system is configured such that opening said inlet module disconnects said drive means from said compaction means, such that said single drive means is only coupled to said compaction means when said inlet means are inaccessible to a user.

12. The waste processor according to claim 7, wherein said inlet means and associated passage means are in a form of a drawer having a plurality of apertures corresponding to said inlet means, said inlet drawer being formed and arranged to open out of said housing so as to present said plurality of apertures for receiving waste material.

13. The waste processor according to claim 12, wherein said discrete compaction means is disconnected from said drive means when said inlet drawer is opened.

14. The waste processor according to claim 7, wherein said passage means includes regulating means configured to regulate a transition of waste through said waste processor such that waste is retained in said compaction means prior to compaction and only passes to said collection zone subsequent to compaction.

* * * * *